(12) United States Patent
Makii

(10) Patent No.: US 9,069,230 B2
(45) Date of Patent: Jun. 30, 2015

(54) DIAPHRAGM UNIT, LENS APPARATUS, AND IMAGE PICKUP APPARATUS

(71) Applicant: SONY CORPORATION, Tokyo (JP)

(72) Inventor: Tatsuo Makii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/308,891

(22) Filed: Jun. 19, 2014

(65) Prior Publication Data
US 2015/0002729 A1    Jan. 1, 2015

(30) Foreign Application Priority Data

Jun. 28, 2013 (JP) ................................. 2013-136351

(51) Int. Cl.
G03B 9/06 (2006.01)
(52) U.S. Cl.
CPC ........................................ G03B 9/06 (2013.01)
(58) Field of Classification Search
CPC ....................................................... G03B 9/06

USPC ................................... 396/508, 510; 359/739
See application file for complete search history.

(56) References Cited

U.S. PATENT DOCUMENTS

| 3,349,682 | A | * | 10/1967 | Nerwin | 396/510 |
| 3,675,562 | A | * | 7/1972 | Sanada et al. | 396/510 |
| 4,974,001 | A | * | 11/1990 | Watanabe et al. | 396/510 |
| 7,553,094 | B2 | * | 6/2009 | Masuda et al. | 396/510 |
| 8,070,370 | B2 | * | 12/2011 | Kawamoto | 396/505 |

FOREIGN PATENT DOCUMENTS

| JP | H02-156233 | A | 6/1990 |
| JP | 4954605 | B2 | 3/2012 |

* cited by examiner

*Primary Examiner* — W B Perkey
(74) *Attorney, Agent, or Firm* — Hazuki International, LLC

(57) ABSTRACT

There is provided a diaphragm unit, including a plurality of diaphragm blades structured to at least rotate, the plurality of diaphragm blades being capable of changing an area of an aperture, each of the diaphragm blades including portions on a part of an inner periphery, a R (radius) of a shape of one portion being at the opposite side of a R (radius) of a shape of the other portion, the inner periphery being a periphery forming an outer periphery of the aperture.

7 Claims, 17 Drawing Sheets

DIAPHRAGM UNIT, LENS APPARATUS, AND IMAGE PICKUP APPARATUS

CROSS REFERENCE TO RELATED APPLICATIONS

This application claims the benefit of Japanese Priority Patent Application JP 2013-136351 filed Jun. 28, 2013, the entire contents of which are incorporated herein by reference.

BACKGROUND

The present disclosure relates to a diaphragm unit, i.e., a so-called iris diaphragm. The present disclosure further relates a lens apparatus including the diaphragm unit, and an image pickup apparatus including the diaphragm unit.

A diaphragm unit, i.e., a so-called iris diaphragm, is widely known (for example, see Japanese Patent Application Laid-open No. H02-156233 and Japanese Patent No. 4954605 (hereinafter referred to as Patent Documents 1 and 2)).

In the full-aperture, the depth of field is small (i.e., focus-adjustable range is narrow). Near the full-aperture, the shape of an aperture of a diaphragm unit affects the appearance quality of a taken image. Specifically, the shape of the aperture affects the shape of blurring and a ghost.

Further, in the middle-aperture to the small-aperture, the depth of field is large (i.e., focus-adjustable range is wide). Near the middle-aperture to the small-aperture, the shape of an aperture of a diaphragm unit affects the appearance quality of a taken image. Specifically, the shape of the aperture affects the shape of blurring and a ghost. In addition, the circle-radius-ratio is decreased. As a result, a portion, in which blades overlap with each other, is acute-angled. Then, light is diffracted at that portion. As a result, the resolving power is degraded, and flare/stray light occur. As a result, the appearance quality of a taken image is degraded.

In view of this, it is desirable that the shape of an aperture be nearly circular. That is, it is desirable that the circle-radius-ratio be higher. Note that the circle-radius-ratio means the ratio (R1/R2) between the radius (R1) of an inscribed circle of an aperture and the radius (R2) of a circumscribed circle of the aperture.

The shape of an aperture of a diaphragm unit is determined based on the shape of the inner periphery of a diaphragm blade. The inner periphery means a periphery of the diaphragm blade, which forms the outer periphery of the aperture.

In general, the shape of the inner periphery is designed by combining a plurality of Rs (radii).

Each of the above-mentioned Patent Documents 1 and 2 discloses the following diaphragm unit. That is, a plurality of arcs are connected smoothly, whereby the shape of an inner periphery of a diaphragm blade is formed. The distance between the origin of each arc and the rotary shaft of the diaphragm blade is uniform. That is, the origins of all the arcs are on one arc. The origin of the one arc is the rotary shaft of the diaphragm blade. The radius of the one arc is the same as the distance between the rotary shaft and the origin of the aperture.

SUMMARY

However, according to a diaphragm unit of a related art as described in the above-mentioned Patent Documents 1 and 2, an aperture (specifically, a smaller-aperture) has an angular shape, whereby the circle-radius-ratio is likely to be degraded. Because of this, it is difficult to keep a circle-radius-ratio always high in a wider aperture range (light-amount control range).

For example, let's assume that the f-number of a lens is F2 in the case where the full-aperture is formed, and the f-number of the same lens is F22 in the case where the minimum-aperture is formed. In this case, it is desirable that the circle-radius-ratio be high irrespective of the size of the aperture of the seven-level aperture range, i.e., F2.8, F4, F5.6, F8, F11, F16, and F22 from the full-aperture (F2). However, a diaphragm apparatus of a related art has a limitation that the circle-radius-ratio of about 0.95 is merely attained between the level lower than the full-aperture by two levels and the level lower than the full-aperture by four levels.

In view of the above-mentioned circumstances, it is desirable to enlarge the aperture range, in which the circle-radius-ratio is always high.

First, according to an embodiment of the present technology, a diaphragm unit includes a plurality of diaphragm blades structured to at least rotate, the plurality of diaphragm blades being capable of changing an area of an aperture, each of the diaphragm blades including portions on a part of an inner periphery, a R (radius) of a shape of one portion being at the opposite side of a R (radius) of a shape of the other portion, the inner periphery being a periphery forming an outer periphery of the aperture.

Because of the portions, which have the shapes having the opposite Rs (radii), respectively, it is possible to smoothly connect the following two portions of the inner periphery. One arc portion has a smaller radius, and is used near the minimum-aperture. The other portion is used to form an aperture closer to the full-aperture.

Second, according to the diaphragm unit of the embodiment of the present technology, it is desirable that one of the portion whose shape have the opposite R (radius) has a form of an envelope, the envelope connecting a plurality of arcs, diameters of the plurality of arcs being the same as aperture-diameters between a full-aperture-diameter and a predetermined-small-aperture-diameter, inclusive.

The respective arcs are connected smoothly because the envelope is used.

Third, according to the diaphragm unit of the embodiment of the present technology, it is desirable that a portion of the inner periphery have a form of a part of an arc, the portion being used to form the aperture in a case where a minimum-aperture is formed, the origin of the arc being on another arc, the origin of the latter arc being a rotary shaft of the diaphragm blade including the inner periphery, the radius of the latter arc being the same as the distance between the rotary shaft and the origin of the aperture.

As a result, the portion of the inner periphery, which is used near the minimum-aperture, is nearly circular.

Fourth, according to the diaphragm unit of the embodiment of the present technology, it is desirable that a portion of the inner periphery have a form of a minor arc of an arc-of-predetermined-small-aperture-diameter, the portion being used to form the aperture in a case where a minimum-aperture is formed, where the number of the diaphragm blades is m, an arc-of-minimum-aperture-diameter is an arc having a diameter, the diameter being the same as a diameter of the aperture in a case where a minimum-aperture is formed, and the arc-of-predetermined-small-aperture-diameter is an arc having a diameter larger than the diameter of the arc-of-minimum-aperture-diameter, the arc having a predetermined circle-radius-ratio to the arc-of-minimum-aperture-diameter, and where the arc-of-minimum-aperture-diameter and the arc-of-predetermined-small-aperture-diameter are arranged under conditions including the origin of the arc-of-minimum-aperture-diameter and the origin of the arc-of-predetermined-small-aperture-diameter are on an arc, the origin of the arc being a rotary shaft of the diaphragm blade including the inner periphery, the radius of the arc being the same as the distance between the rotary shaft and the origin of the aperture, the arc-of-minimum-aperture-diameter intersects with the arc-of-predetermined-small-aperture-diameter at two intersections, and a central angle of the minor arc of the arc-of-predetermined-small-aperture-diameter formed between the two intersections is $\pi/m$, and a central angle of a minor arc of the arc-of-minimum-aperture-diameter formed between the two intersections is $2\pi/m$.

As a result, in the case where the minimum-aperture is formed, the aperture is formed only by combining the following portions of the respective diaphragm blades. That is, each portion has the form of the minor arc of the arc-of-predetermined-small-aperture-diameter.

Fifth, according to the diaphragm unit of the embodiment of the present technology, it is desirable that a portion of the inner periphery have a form of a part of an arc-of-predetermined-small-aperture-diameter, the portion being used to form the aperture in a case where a minimum-aperture is formed, the origin of the arc-of-predetermined-small-aperture-diameter being on an arc, the origin of the arc being a rotary shaft of the diaphragm blade including the inner periphery, the radius of the arc being the same as the distance between the rotary shaft and the origin of the aperture, and a portion of the inner periphery has a shape connecting arcs between an arc-of-full-aperture-diameter and the arc-of-predetermined-small-aperture-diameter, inclusive, the portion being at a side of the rotary shaft and behind a portion having a form of the arc-of-predetermined-small-aperture-diameter, the arcs being arrayed under a condition that the arc-of-predetermined-small-aperture-diameter is inscribed in a concentric circle of the arc-of-full-aperture-diameter, a difference between the diameter of the concentric circle and the diameter of the arc-of-full-aperture-diameter is equal to or smaller than a predetermined value, where an arc-of-minimum-aperture-diameter is an arc having a diameter, the diameter being the same as the diameter of the aperture in a case where a minimum-aperture is formed, the arc-of-full-aperture-diameter is an arc having a diameter, the diameter being the same as the diameter of the aperture in a case where a full-aperture is formed, and the arc-of-predetermined-small-aperture-diameter is an arc having a diameter, the diameter being larger than the diameter of the arc-of-minimum-aperture-diameter, the arc having a predetermined circle-radius-ratio to the arc-of-minimum-aperture-diameter.

As a result, the circle-radius-ratio of the aperture in the case where the full-aperture is formed is the same as the diameter-ratio between the arc-of-full-aperture-diameter and its concentric circle.

Sixth, according to the diaphragm unit of the embodiment of the present technology, it is desirable that a shape of a portion of the inner periphery have a form of a part of a blade-step-preventing-arc, the portion being in front of a portion having a form of the arc-of-predetermined-small-aperture-diameter, and a length of the portion of the inner periphery having the form of the part of the blade-step-preventing-arc be determined under a condition that an angle between two lines is equal to or larger than $2\pi/m$, one line connecting a first intersection with the origin of the blade-step-preventing-arc, the other line connecting a second intersection and the origin of the blade-step-preventing-arc, where the number of the diaphragm blades is m, an arc-guaranteeing-full-aperture-diameter is an arc having a diameter larger than the diameter of the arc-of-full-aperture-diameter, the arc being arranged such that the origin of the arc being on the origin of the aperture, the blade-step-preventing-arc is an arc having a diameter, the diameter being the same as the diameter of the arc-of-full-aperture-diameter, the arc being tangential to the arc-of-predetermined-small-aperture-diameter, the first intersection is one of intersections of the arc-of-full-aperture-diameter and the arc-guaranteeing-full-aperture-diameter, the one intersection is positioned at a side of the rotary shaft, and the second intersection is one of intersections of an arc-guaranteeing-full-aperture-diameter of a diaphragm blade and the blade-step-preventing-arc, the diaphragm blade being adjacent to a front side of another diaphragm blade, the front side being opposite to the rotary shaft, the one intersection being positioned at the front side.

As a result, near the full-aperture, the front portion (i.e., portion whose diameter is the same as the diameter of the arc-of-full-aperture-diameter) of the inner periphery of one diaphragm blade overlaps with a portion (i.e., portion whose R (radius) is approximately the same as the R (radius) of the arc-of-full-aperture-diameter) of the inner periphery of the adjacent diaphragm blade.

Further, according to an embodiment of the present technology, a lens apparatus includes: a diaphragm unit including a plurality of diaphragm blades structured to at least rotate, the plurality of diaphragm blades being capable of changing an area of an aperture, each of the diaphragm blades including portions on a part of an inner periphery, a R (radius) of a shape of one portion being at the opposite side of a R (radius) of a shape of the other portion, the inner periphery being a periphery forming an outer periphery of the aperture; and an image pickup lens configured to guide object light to the aperture of the diaphragm unit.

Further, according to an embodiment of the present technology, an image pickup apparatus includes: a diaphragm unit including a plurality of diaphragm blades structured to at least rotate, the plurality of diaphragm blades being capable of changing an area of an aperture, each of the diaphragm blades including portions on a part of an inner periphery, a R (radius) of a shape of one portion being at the opposite side of a R (radius) of a shape of the other portion, the inner periphery being a periphery forming an outer periphery of the aperture; an image pickup lens configured to guide object light to the aperture of the diaphragm unit; and an image pickup device configured to receive the object light entered through the aperture, and to obtain an imaging signal.

According to the lens apparatus and the image pickup apparatus of the present technology, similar to the above-mentioned diaphragm unit of the present technology, because of the portions, which have the shapes having the opposite Rs (radii), respectively, it is possible to smoothly connect the following two portions of the inner periphery. One arc portion has a smaller radius, and is used near the minimum-aperture. The other portion is used to form an aperture closer to the full-aperture.

According to the present technology, it is possible to enlarge the aperture range, in which the circle-radius-ratio is always high.

These and other objects, features and advantages of the present disclosure will become more apparent in light of the

DETAILED DESCRIPTION OF EMBODIMENTS

Hereinafter, an embodiment of the present disclosure will be described with reference to the drawings.

Note that the embodiment of the present disclosure will be described in the following order:

<1. Diaphragm unit of the embodiment>
[1-1. Structure of diaphragm unit]
[1-2. Shape of inner periphery]
[1-3. Conclusion and effects]
<2. Lens apparatus and image pickup apparatus>
<3. Examples of modification>
<4. Present technology>
<1. Diaphragm Unit of the Embodiment>
[1-1. Structure of Diaphragm Unit]
Hereinafter, an embodiment of the present disclosure will be described with reference to the drawings.

Figure 1:
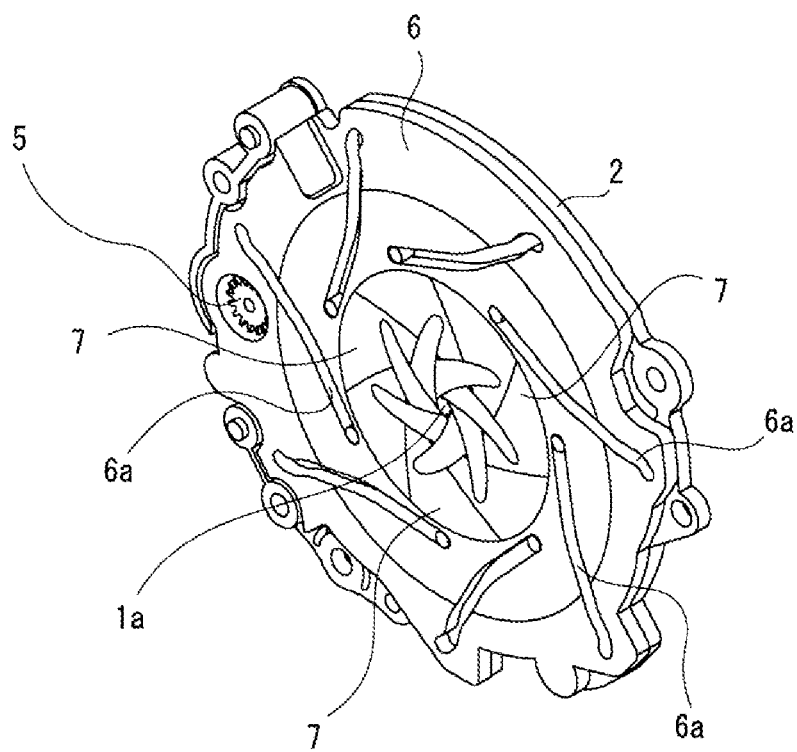
FIG. 1 is a perspective view showing a diaphragm unit of the embodiment, which is seen from the back side.
Figure 2:
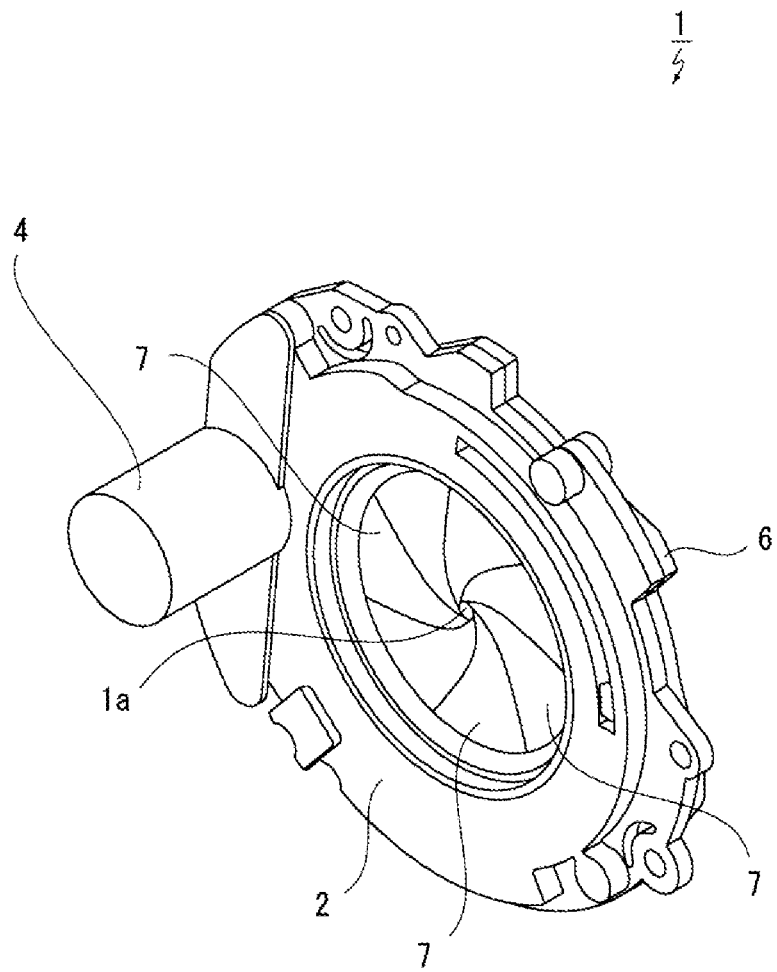
FIG. 2 is a perspective view showing the diaphragm unit of the embodiment, which is seen from the front side.
Figure 3:
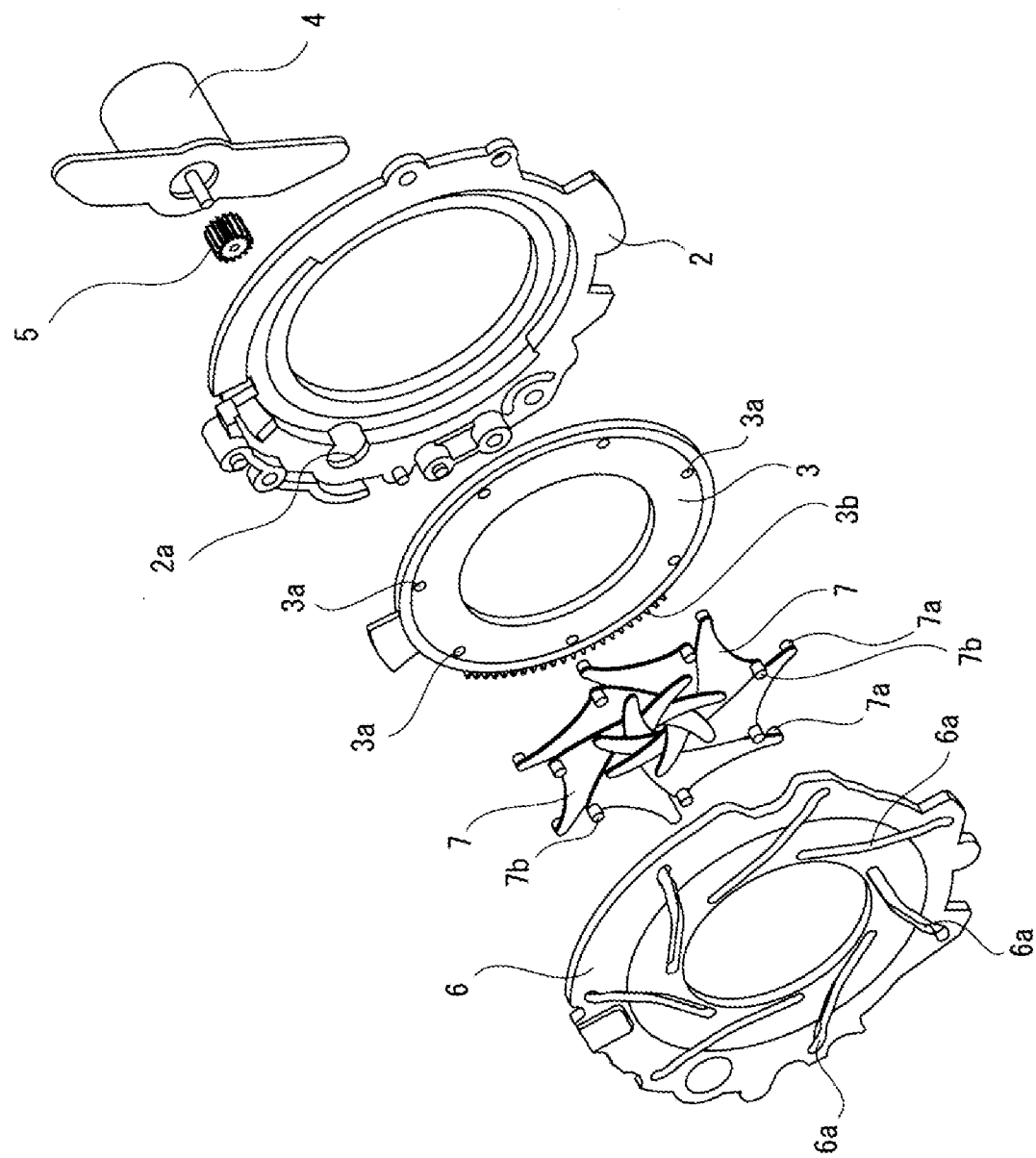
FIG. 3 is an exploded perspective view showing the diaphragm unit of the embodiment.

Each of FIG. 1 to FIG. 3 illustrates the structure of the diaphragm unit 1 of the embodiment. FIG. 1 is a perspective view showing the diaphragm unit 1, which is seen from the back side. FIG. 2 is a perspective view showing the diaphragm unit 1, which is seen from the front side. FIG. 3 is an exploded perspective view showing the diaphragm unit 1. Note that "the front side" of the diaphragm unit 1 faces incident light from an object. "The back side" is opposite to the front side.

The diaphragm unit 1 includes the base plate 2, the actuating ring 3, the stepping motor 4, the pinion 5, the blade cap 6, and the plurality of diaphragm blades 7, 7, . . . .

The diaphragm unit 1 is a so-called iris diaphragm, and has the following structure. That is, the plurality of diaphragm blades 7, 7, . . . at least rotate. As a result, it is possible to change the area of the aperture 1a. In this example, there are seven diaphragm blades 7, 7, . . . .

The back side of the base plate 2 abuts on the actuating ring 3 in the thrust direction. The actuating ring 3 fits in the base plate 2. At the same time, the actuating ring 3, which abuts on the base plate 2, is capable of rotating in the radial direction (see FIG. 3). Further, the stepping motor 4 is connected to the front side of the base plate 2. The pinion 5 is connected with the rotary shaft of the stepping motor 4. The insertion opening 2a is formed on the base plate 2. A part of the pinion 5 appears from the back side of the base plate 2 through the insertion opening 2a.

The plurality of rotary-shaft insertion holes 3a, 3a, . . . are formed on the back side of the actuating ring 3. The gear 3b is formed on the outer periphery of the actuating ring 3. The gear 3b engages with the pinion 5.

The blade cap 6 includes the plurality of cam grooves 6a, 6a, . . . .

The rotary shafts 7a, 7a, . . . are formed on the front sides of the diaphragm blades 7, 7, . . . , respectively. The drive shafts 7b, 7b, . . . are formed on the back sides of the diaphragm blades 7, 7, . . . , respectively.

The rotary shafts 7a, 7a, . . . of the diaphragm blades 7, 7, . . . rotatably fit in the rotary-shaft insertion holes 3a, 3a, . . . of the actuating ring 3, respectively. The drive shafts 7b, 7b, . . . of the diaphragm blades 7, 7, . . . slidably fit in the cam grooves 6a, 6a, . . . of the blade cap 6, respectively. The diaphragm blades 7, 7, . . . are held between the actuating ring 3 and the blade cap 6 (held in blade room). The diaphragm blades 7, 7, . . . are capable of moving in the blade room (clearance) in the thrust direction appropriately.

In the diaphragm unit 1, the actuating ring 3 receives the rotative power of the stepping motor 4. As a result, the actuating ring 3 rotates. As a result, the drive shafts 7b, 7b, . . . slide along the cam grooves 6a, 6a, . . . , respectively. The diaphragm blades 7, 7, . . . thus travel. At the same time, the diaphragm blades 7, 7, . . . rotate around the rotary shafts 7a, 7a, . . . , respectively. As described above, the diaphragm blades 7, 7, . . . travel and rotate. As a result, an overlapped area of each diaphragm blade 7 and the adjacent diaphragm blade 7 is changed. At the same time, protrusion length of the inner periphery 7c (see FIG. 11, etc.) of each the diaphragm blade 7 in the optical axis side is changed. As a result, the area of the aperture 1a is changed. In other words, the diaphragm unit 1 is capable of controlling the amount of light.

Here, the inner periphery 7c of the diaphragm blade 7 forms the outer periphery of the aperture 1a. The referential symbol (7c) of the inner periphery 7c is not shown in FIG. 1 to FIG. 3.

[1-2. Shape of Inner Periphery]
With reference to FIG. 4 to FIG. 14, a design example of the shape of the inner periphery 7c of each diaphragm blade 7 will be described.

In this example, the basic design concept of the shape of the inner periphery 7c follows the concept in the past. That is, the inner periphery 7c includes a plurality of arcs of a plurality of aperture-diameters.

Note that the following is the precondition of the below description. In this example, there are 7.5 aperture levels between the full-aperture and the minimum-aperture. That is, the minimum-aperture is narrower than the full-aperture by 7.5 levels. In this example, it is desirable that the circle-radius-ratio of the aperture 1a be always equal to or larger than a predetermined circle-radius-ratio (for example 0.95) in the entire aperture range. In the aperture range, the smallest aperture is the aperture narrower than the full-aperture by 7.5 levels).

Hereinafter, the procedure of designing the shape of the inner periphery 7c of this example will be described in the following steps [1] to [6].

[1] The arcs of the respective aperture-diameters are determined. The respective aperture-diameters are between the full-aperture-diameter and a predetermined-small-aperture-diameter, inclusive. The arc-of-minimum-aperture-diameter is determined. The arc-guaranteeing-full-aperture-diameter is determined.

First, the arcs of the respective aperture-diameters are described. The arcs are between the arc-of-full-aperture-diameter and the arc-of-predetermined-small-aperture-diameter, inclusive. Note that the "aperture-diameter" means the diameter of the aperture 1a. The "arc of aperture-diameter" means that the diameter of the arc is the same as the aperture-diameter.

The arcs of the respective aperture-diameters between the full-aperture-diameter and the predetermined-small-aperture-diameter, inclusive, are determined. Before that, the aperture-diameter of the predetermined-small-aperture-diameter is determined previously. Also, the number of levels between the full-aperture-diameter and the predetermined-small-aperture-diameter is determined previously.

In this example, the predetermined-small-aperture-diameter is obtained by reducing the full-aperture-diameter by 5.5 levels. Further, the aperture-diameter is reduced in decrements of 1/6 levels from the full-aperture-diameter to the predetermined-small-aperture-diameter.

In view of this, thirty-four arcs are determined as the arcs of the respective aperture-diameters between the full-aperture-diameter and the predetermined-small-aperture-diameter, inclusive. The thirty-four arcs correspond to the respective aperture-diameters in the case where the aperture is reduced from the full-aperture-diameter by 5.5 levels in decrements of 1/6 levels.

Note that the circle-radius-ratio of the above-mentioned "arc-of-predetermined-small-aperture-diameter" (arc having aperture-diameter, which is reduced by 5.5 levels from the full-aperture-diameter) is equal to or larger than the circle-radius-ratio (0.95) of the "arc-of-minimum-aperture-diameter" (arc having aperture-diameter, which is reduced by 7.5 levels from the full-aperture-diameter). As described above, the circle-radius-ratio of the "arc-of-predetermined-small-aperture-diameter" shall be equal to or larger than the expected circle-radius-ratio of "the arc-of-minimum-aperture-diameter". This will be revealed in the below description.

Further, in the step [1], as described above, the arcs of the respective aperture-diameters between the full-aperture-diameter and the predetermined-small-aperture-diameter, inclusive, are determined. In addition, the arc-of-minimum-aperture-diameter is determined. In addition, the arc-guaranteeing-full-aperture-diameter is determined.

In this example, the arc-of-minimum-aperture-diameter is obtained by reducing the full-aperture by 7.5 levels.

The arc-guaranteeing-full-aperture-diameter guarantees the preset full-aperture-diameter in a case of displacement of the members, unevenness of accuracy of the members, backlash, and the like. The diameter of the arc-guaranteeing-full-aperture-diameter is larger than the full-aperture-diameter.

In this example, the arc-guaranteeing-full-aperture-diameter is determined as follows. That is, the diameter of the arc-guaranteeing-full-aperture-diameter is larger than the full-aperture-diameter by 5%.

In this design example, thirty-six arcs in total are determined in the above step [1]. The shape of the inner periphery 7c is designed based on the thirty-six arcs.

Note that, in the above description, the predetermined-small-aperture-diameter is merely an example. The number of decrement levels of the respective aperture-diameters from the full-aperture-diameter to the predetermined-small-aperture-diameter is merely an example. They may be arbitrarily changed depending on the aperture range, which is expected to have a high circle-radius-ratio, and depending on the expected circle-radius-ratio.

Here, the "arc-guaranteeing-full-aperture-diameter", the "arc-of-full-aperture-diameter", the "arc-of-predetermined-small-aperture-diameter", and the "arc-of-minimum-aperture-diameter" are determined in the above step [1]. They are denoted by the following symbols:

arc-guaranteeing-full-aperture-diameter Ahh;
arc-of-full-aperture-diameter Akh;
arc-of-predetermined-small-aperture-diameter Arm; and
arc-of-minimum-aperture-diameter Asm.

[2] The arc-guaranteeing-full-aperture-diameter Ahh is arranged such that the origin Ok of the arc-guaranteeing-full-aperture-diameter Ahh is the origin Oc of the aperture 1a.

Figure 4:
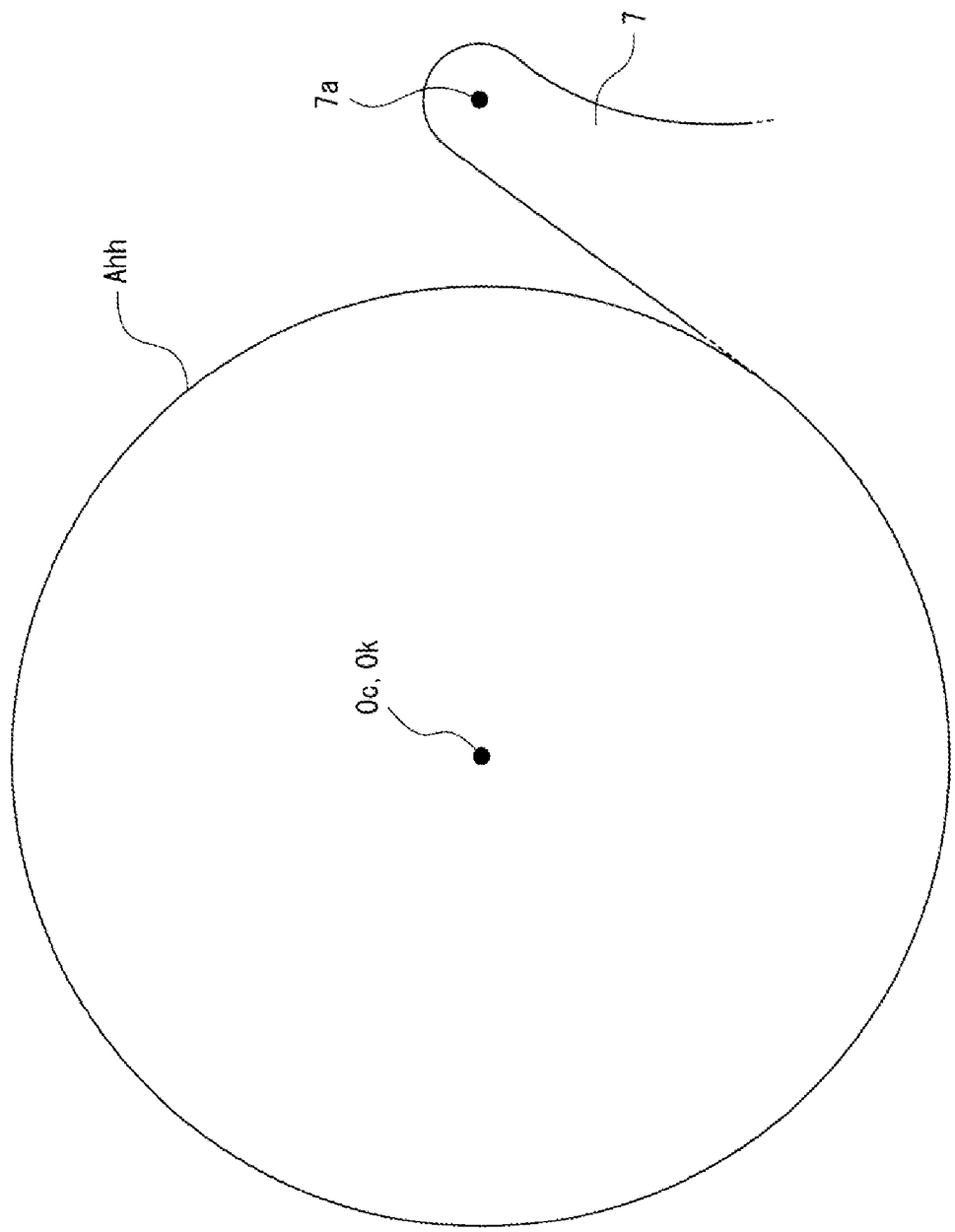
FIG. 4 schematically shows the position relation of an arc-guaranteeing-full-aperture-diameter, the origin of the arc-guaranteeing-full-aperture-diameter, the origin of an aperture, and a rotary shaft of a diaphragm blade.

FIG. 4 schematically shows the position relation of the arc-guaranteeing-full-aperture-diameter Ahh, the origin Ok of the arc-guaranteeing-full-aperture-diameter Ahh, the origin Oc of the aperture 1a, and the rotary shaft 7a of the diaphragm blade 7. Note that the origin Oc of the aperture 1a is approximately the same as the optical axis.

As shown in FIG. 4, the arc-guaranteeing-full-aperture-diameter Ahh is arranged such that the origin Ok of the arc-guaranteeing-full-aperture-diameter Ahh is the origin Oc of the aperture 1a.

[3] The position relation between the arc-of-minimum-aperture-diameter Asm and the arc-of-predetermined-small-aperture-diameter Arm is determined.

Figure 5:
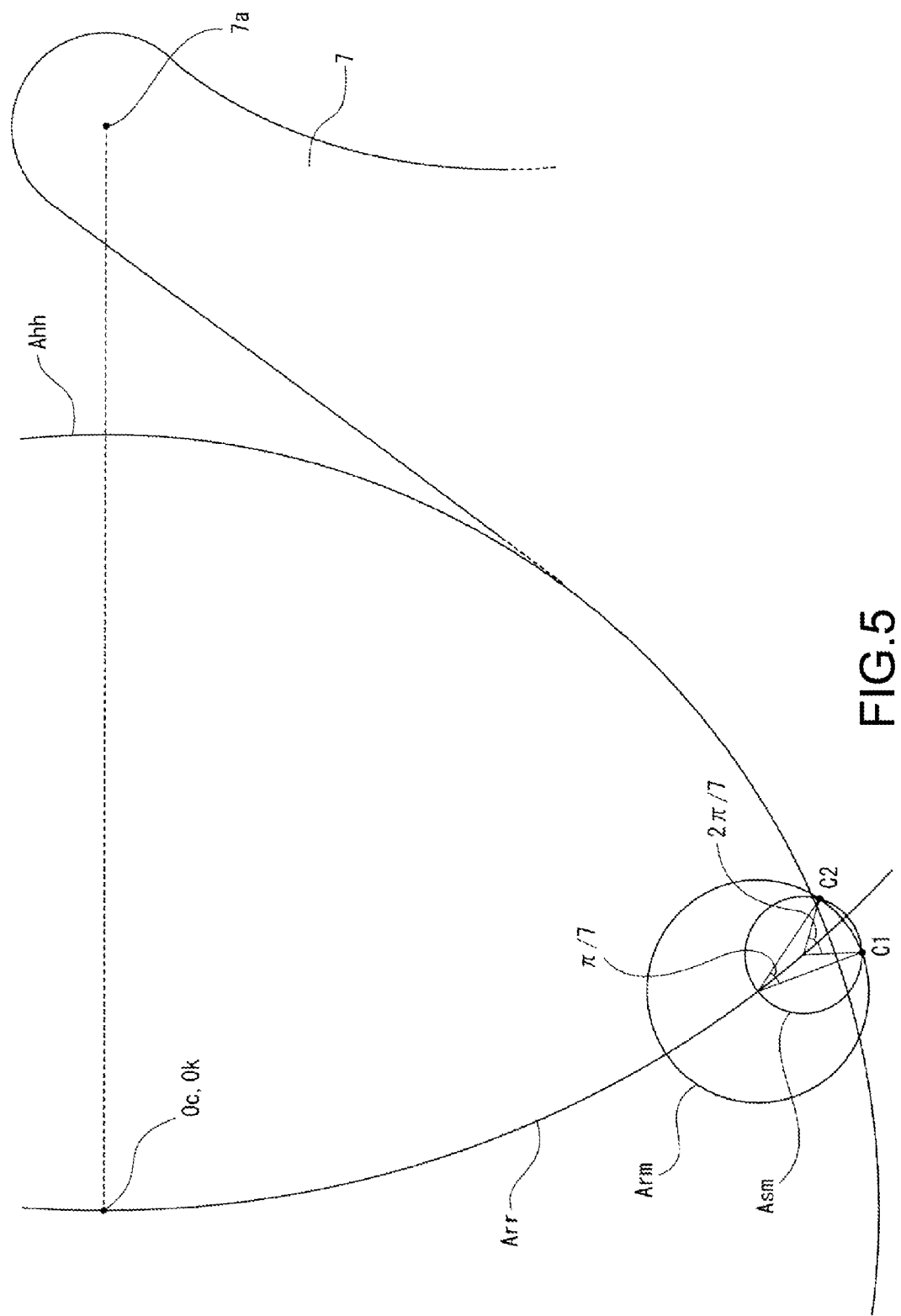
FIG. 5 is a diagram illustrating the position relation between an arc-of-minimum-aperture-diameter and an arc-of-predetermined-small-aperture-diameter.

FIG. 5 is a diagram illustrating the position relation between the arc-of-minimum-aperture-diameter Asm and the arc-of-predetermined-small-aperture-diameter Arm.

In the step [3], the position relation between the arc-of-minimum-aperture-diameter Asm and the arc-of-predetermined-small-aperture-diameter Arm is determined. In this case, the following conditions 1) to 3) are met.

1) The origin of the arc-of-minimum-aperture-diameter Asm is on the arc Arr. The origin of the arc-of-predetermined-small-aperture-diameter Arm is on the arc Arr. The origin of the arc Arr is the rotary shaft 7a of the diaphragm blade 7. The radius of the arc Arr equals the distance between the rotary shaft 7a and the origin Oc of the aperture 1a.

2) The arc-of-minimum-aperture-diameter Asm intersects with the arc-of-predetermined-small-aperture-diameter Arm at the two intersections (c1 and c2).

3) A minor arc of the arc-of-predetermined-small-aperture-diameter Arm is formed between the two intersections c1 and c2. The central angle of the minor arc is $\pi/7$. A minor arc of the arc-of-minimum-aperture-diameter Asm is formed between the two intersections c1 and c2. The central angle of the minor arc is 2π/7. Note that "7" is the number of the diaphragm blades 7.

In the embodiment, the arc-of-predetermined-small-aperture-diameter Arm is arranged based on the above-mentioned conditions 1) to 3). The minor arc of the arc-of-predetermined-small-aperture-diameter Arm is adopted as the shape of a portion of the inner periphery 7c of the diaphragm blade 7. The portion of the inner periphery 7c is used to form the aperture 1a in the case where the minimum-aperture is formed.

Here, as described above, the minor arc of the arc-of-predetermined-small-aperture-diameter Arm is adopted as the shape of a portion of the inner periphery 7c of the diaphragm blade 7. This portion of the inner periphery 7c is used to form the aperture 1a in the case where the minimum-aperture is formed. At this time, the seven minor arcs form the aperture 1a in the case where the minimum-aperture is formed.

As described above, the circle-radius-ratio of the arc-of-predetermined-small-aperture-diameter Arm is equal to or larger than the expected circle-radius-ratio of the arc-of-minimum-aperture-diameter Asm. Therefore, as described above, the seven minor arcs of the arc-of-predetermined-small-aperture-diameter Arm form the aperture 1a. As a result, the circle-radius-ratio of the minimum-aperture may be equal to or larger than the expected circle-radius-ratio.

Note that, as is understood from the above description, in the embodiment, the shape of the arc-of-minimum-aperture-diameter Asm is not directly used as the portion, which is used in the case where the minimum-aperture is formed. The arc-of-minimum-aperture-diameter Asm is merely used to position the arc-of-predetermined-small-aperture-diameter Arm. The shape of the arc Arm is directly used as the portion, which is used in the case where the minimum-aperture is formed.

Here, when the step [3] is completed, the position of the arc-guaranteeing-full-aperture-diameter Ahh is only determined in relation to the origin Oc of the aperture 1a and to the rotary shaft 7a of the diaphragm blade 7. In other words, at this time, the position of the arc-of-predetermined-small-aperture-diameter Arm is not determined uniquely.

[4] Thirty-three arcs are arranged. The thirty-three arcs correspond to the respective arcs from the arc-of-full-aperture-diameter Akh to the arc just before the arc-of-predetermined-small-aperture-diameter Arm. The aperture-diameter of each arc is reduced in decrements of 1/6 levels. The following conditions are met.

4) The central angle of a portion, which contributes to forming the aperture 1a of each level, of an arc is the same for all the levels.

5) The arc-of-predetermined-small-aperture-diameter Arm is inscribed in the concentric circle Akd of the arc-of-full-aperture-diameter Akh.

Note that, here, the sentence an arc "is inscribed in" another arc means the following situation. That is, an arc having a smaller diameter is positioned in an arc having a larger diameter. In addition, a point on the arc having the smaller diameter contacts a point on the arc having the larger diameter.

The above-mentioned condition 4) will be described.

Figure 6:
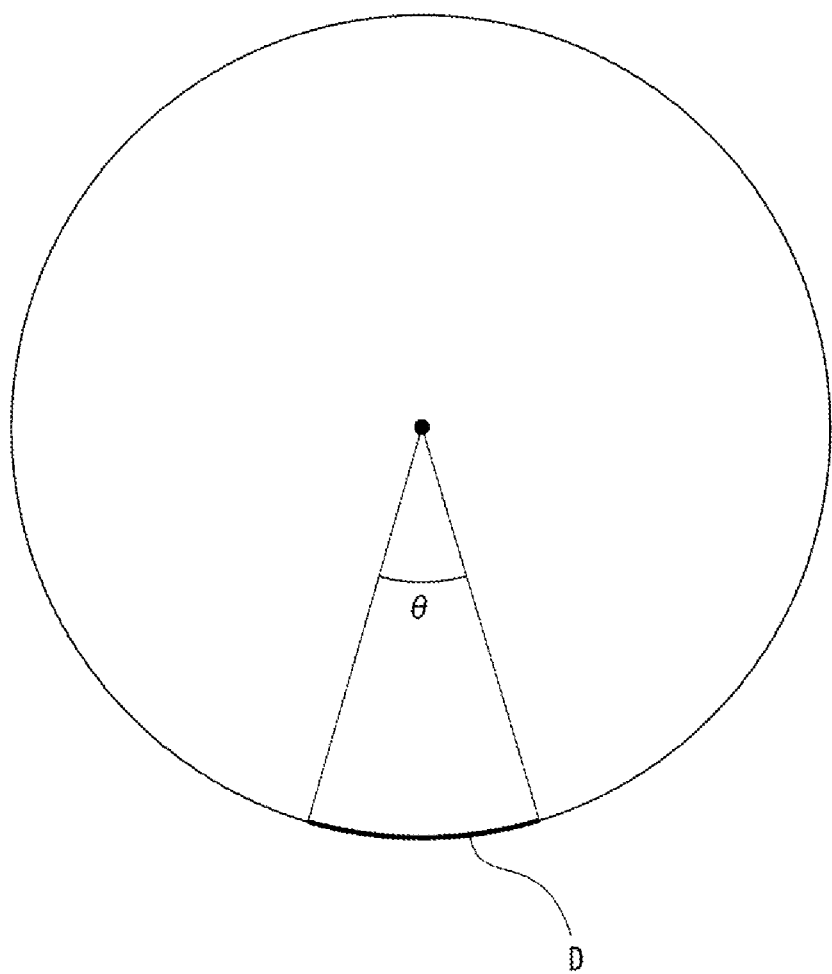
FIG. 6 is a diagram illustrating the condition 4) of the step [4]

FIG. 6 is a diagram illustrating a portion of an arc of each level. This portion contributes to forming the aperture 1a of a certain level. FIG. 6 also illustrates the central angle (θ) of this portion. FIG. 6 shows one typical arc out of the arcs of all the levels. In FIG. 6, the portion illustrated with the thick line D shows a portion, which contributes to forming the aperture 1a of the certain level.

The above-mentioned condition 4) defines that the central angles θ of the thirty-three arcs are all the same.

Figure 7:
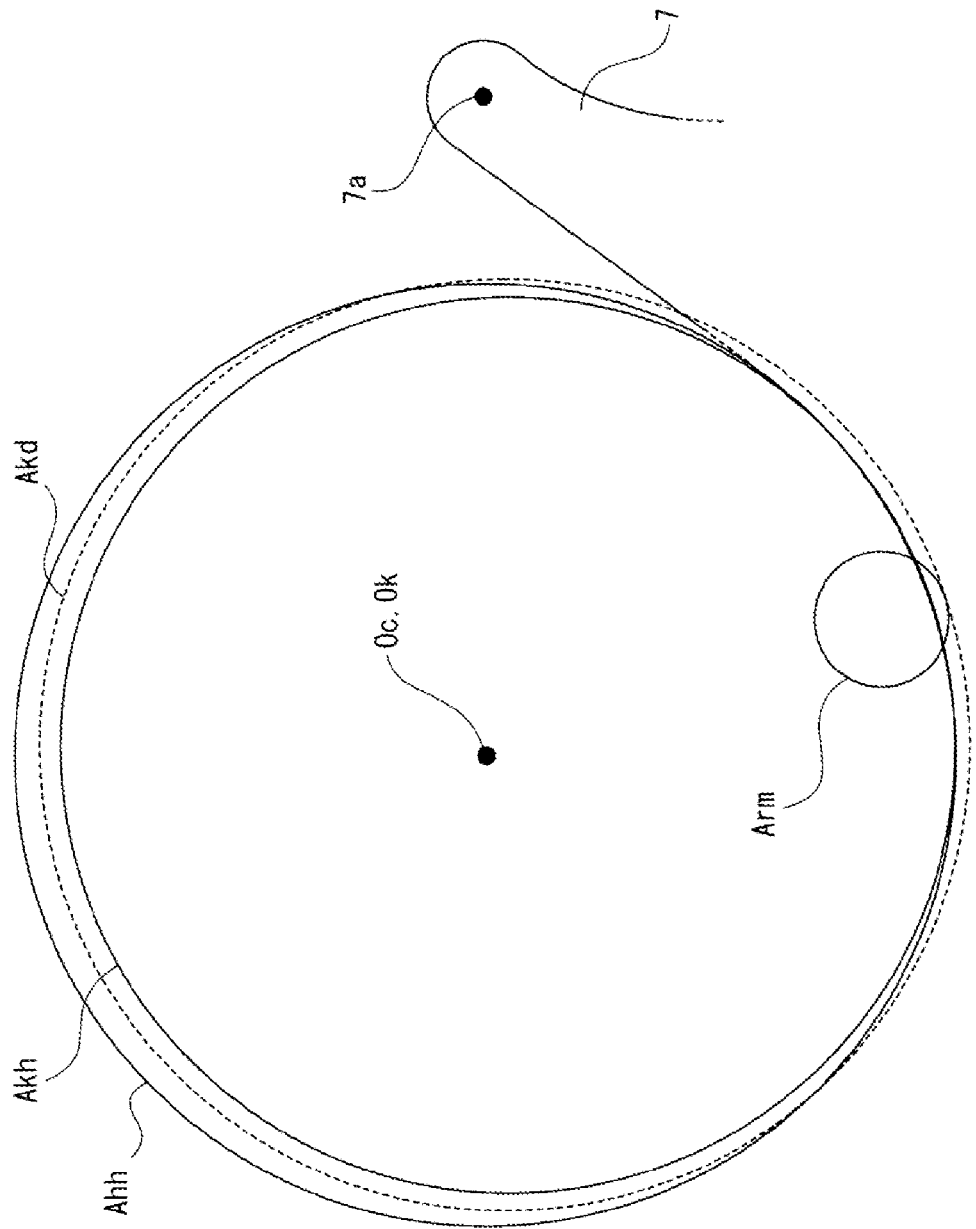
FIG. 7 is a diagram illustrating the condition 5) of the step [4]

FIG. 7 is a diagram illustrating the above-mentioned condition 5). FIG. 7 schematically shows the position relation of the arc-of-predetermined-small-aperture-diameter Arm, the arc-of-full-aperture-diameter Akh, and the concentric circle Akd of the arc Akh.

The diameter of the concentric circle Akd is determined based on a circle-radius-ratio, which is expected to be attained in the case where the full-aperture is formed. In this example, the diameter of the concentric circle Akd is determined by dividing the full-aperture-diameter by 0.97. The diameter of the concentric circle Akd may be determined based on the circle-radius-ratio, which is expected to be attained in the case where the full-aperture is formed. Specifically, the diameter of the concentric circle Akd may be determined such that the difference between the diameter of the concentric circle Akd and the diameter of the arc-of-full-aperture-diameter Akh is equal to or less than a predetermined value.

The above-mentioned condition 5) defines the following situation. That is, the arc-of-predetermined-small-aperture-diameter Arm is inscribed in the concentric circle Akd. In other words, the arc-of-predetermined-small-aperture-diameter Arm is positioned in the concentric circle Akd. In addition, a point on the arc-of-predetermined-small-aperture-diameter Arm contacts a point on the concentric circle Akd.

In the above step [4], the relation between the respective arcs and the origin Oc of the aperture 1a is determined. The respective arcs are reduced in decrements of 1/6 levels from the arc-of-full-aperture-diameter Akh to the arc-of-predetermined-small-aperture-diameter Arm. Specifically, the distance between the origin of each arc and the origin Oc of the aperture 1a is determined. At this time, the position relation between each arc and the rotary shaft 7a is not determined yet. Because of this, the position of each arc is not uniquely determined yet.

Figure 8:
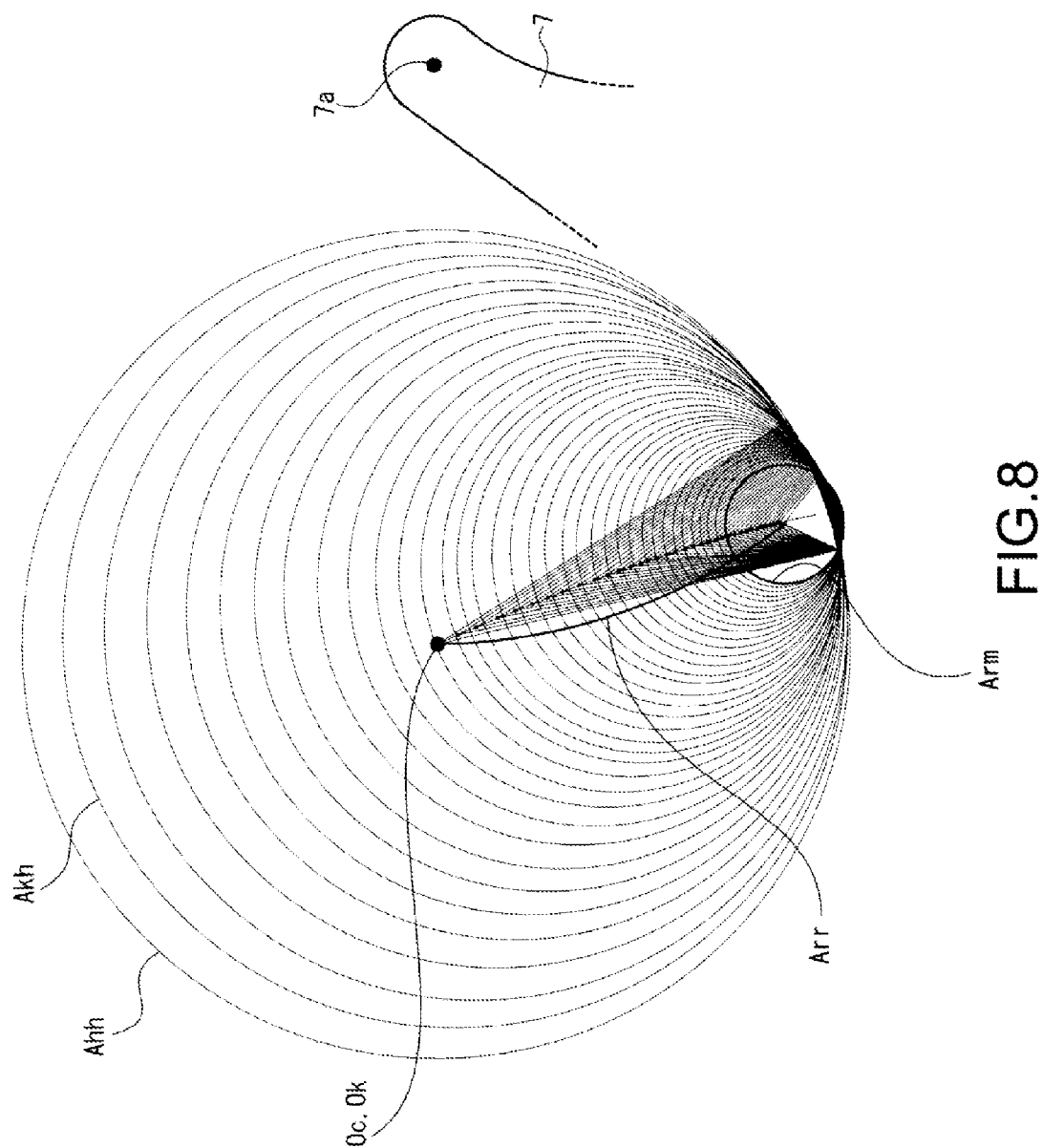
FIG. 8 schematically shows the respective arcs, the distance between the center of each arc and the origin of the aperture being determined based on the step [4]

FIG. 8 schematically shows the respective arcs. The distance between the center of each arc and the origin Oc of the aperture 1a is determined based on the step [4]. Note that FIG. 8 also illustrates the rotary shaft 7a, the origin Oc of the aperture 1a, the arc Arr, and the arc-guaranteeing-full-aperture-diameter Ahh. The origin of the arc Arr is the rotary shaft 7a. The radius of the arc Arr equals the distance between the rotary shaft 7a and the origin Oc of the aperture 1a.

In FIG. 8, each dot shows the origin of each arc from the arc-of-full-aperture-diameter Akh to the arc-of-predetermined-small-aperture-diameter Arm reduced in decrements of 1/6 levels. As shown in FIG. 8, if the above-mentioned conditions 1) to 5) are met, the origins of the respective arcs are arrayed in an arch shape. The arch shape is the inverse of the arc Arr.

This is totally different from the above-mentioned related art of Patent Documents 1 and 2. According to Patent Documents 1 and 2, the origins of the respective arcs, which contribute to forming the aperture 1a, are arrayed on the arc Arr.

[5] The shape of the front side of the inner periphery 7c is determined.

The step [5] is performed to prevent a so-called blade-step status from occurring. Note that the "front side" of the diaphragm blade 7 is opposite to a side, on which the rotary shaft 7a is formed.

In the step [5], the shape of the front side of the inner periphery 7c is determined. The front side is in front of the portion, which has the form of the arc-of-predetermined-small-aperture-diameter Arm (portion between the intersections c1 and c2).

Figure 9:
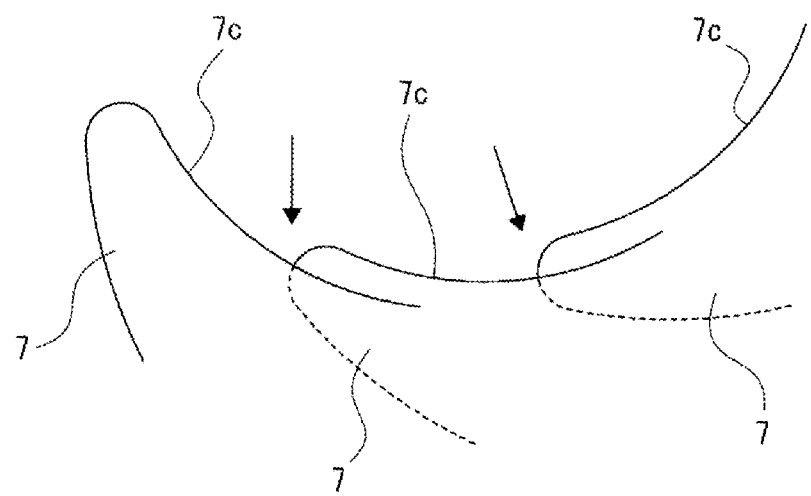
FIG. 9 is a diagram illustrating a blade-step status.

FIG. 9 is a diagram illustrating the blade-step status. The blade-step status is the following status. That is, the inner periphery 7c of one diaphragm blade 7 does not overlap with the inner periphery 7c of the adjacent diaphragm blade 7. Steps appear on the outer periphery of the aperture 1a (see arrows of FIG. 9).

Specifically, the blade-step status is likely to appear near the full-aperture. The shape of the aperture 1a is degraded seriously because of the blade-step status. It is necessary to avoid the occurrence of the blade-step status.

Figure 10:
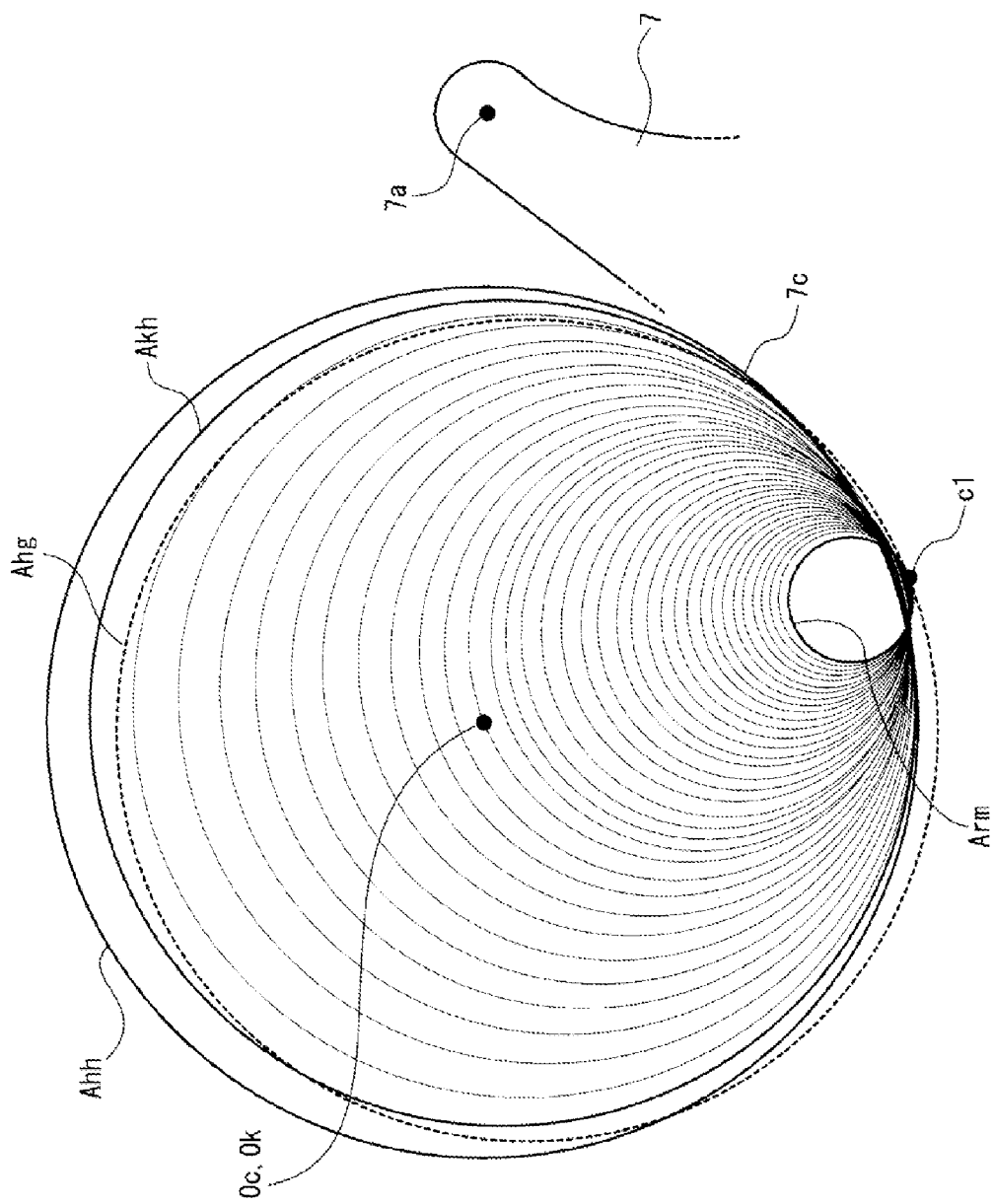
FIG. 10 is a diagram illustrating an arc, which is used to avoid the occurrence of the blade-step status.

FIG. 10 is a diagram illustrating the blade-step-preventing-arc Ahg. The blade-step-preventing-arc Ahg is used to design the shape of the blade 7 to avoid the occurrence of the blade-step status.

The position of the arc-of-predetermined-small-aperture-diameter Arm is conditioned already in the above-mentioned steps [3] and [4]. In the step [5], first, the blade-step-preventing-arc Ahg of FIG. 10 is determined based on the arc-of-predetermined-small-aperture-diameter Arm. That is, the blade-step-preventing-arc Ahg meets the following conditions.

6) The radius of the blade-step-preventing-arc Ahg is the same as the radius of the arc-of-full-aperture-diameter Akh.

7) The blade-step-preventing-arc Ahg is tangential to the arc-of-predetermined-small-aperture-diameter Arm.

Note that, here, "to be tangential" means the following situation. That is, the blade-step-preventing-arc Ahg is circumscribed to the arc-of-predetermined-small-aperture-diameter Arm at one intersection c1. "To be circumscribed to" means the following situation. That is, an arc having a larger radius is positioned outside of an arc having a smaller radius. In addition, a point on the arc of the larger radius contacts a point on the arc of the smaller radius.

In the step [5], a portion of the blade-step-preventing-arc Ahg is adopted as the shape of the front side of the inner periphery 7c. The front side is in front of the portion, which has the form of the arc-of-predetermined-small-aperture-diameter Arm. Specifically, the shape of a portion of the blade-step-preventing-arc Ahg, which is in front of the tangent point, is adopted. The blade-step-preventing-arc Ahg contacts the arc-of-predetermined-small-aperture-diameter Arm at the tangent point.

Note that, in order to prevent the blade-step status from occurring, it is necessary to define a portion of the blade-step-preventing-arc Ahg, which is adopted as the shape of the front side of the inner periphery 7c. The length of the portion of the inner periphery 7c, which has the form of a portion of the blade-step-preventing-arc Ahg, is defined. In this case, the following condition shall be met.

8) The arc-of-full-aperture-diameter Akh intersects with the arc-guaranteeing-full-aperture-diameter Ahh at two intersections. One intersection, which is positioned at the rotary shaft 7a side, is referred to as the first intersection c3. The arc-guaranteeing-full-aperture-diameter Ahh of the adjacent diaphragm blade 7 (the diaphragm blade 7 adjacent in the front side direction of the inner periphery 7c) is referred to as the arc-guaranteeing-full-aperture-diameter Ahh'. The arc-guaranteeing-full-aperture-diameter Ahh' intersects with the blade-step-preventing-arc Ahg at two intersections. One intersection, which is positioned at the front side of the inner periphery 7c, is referred to as the second intersection c4. The origin of the blade-step-preventing-arc Ahg is referred to as the origin Og. The angle between the line connecting the first intersection c3 with the origin Og and the line connecting the second intersection c4 with the origin Og is referred to as the angle G. At this time, the angle G is $2\pi/7$ or more.

Figure 11:
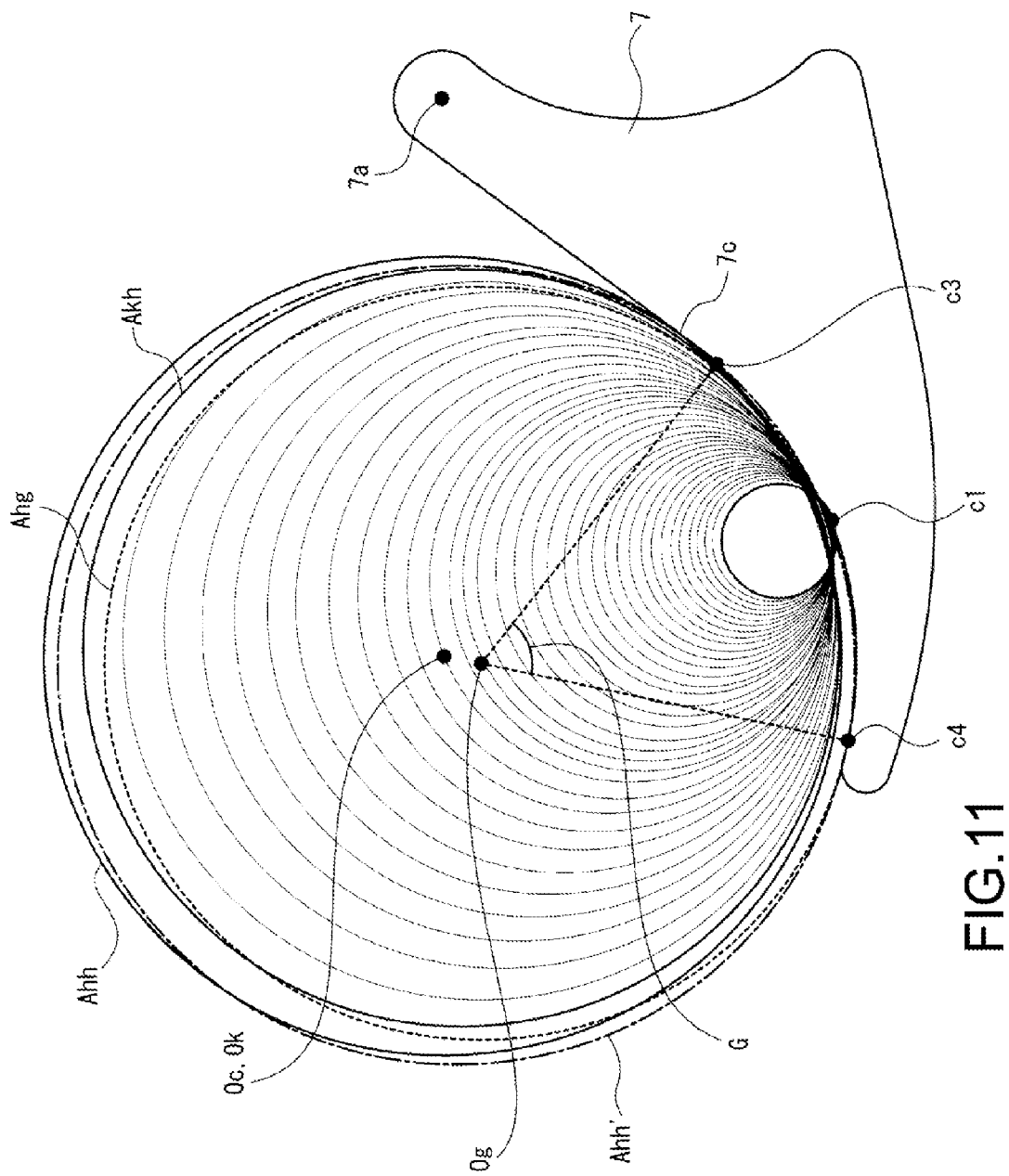
FIG. 11 is a diagram illustrating the condition 8) of the step [5]

FIG. 11 is a diagram illustrating the condition 8).

The arc-guaranteeing-full-aperture-diameter Ahh' of the adjacent diaphragm blade 7 is arranged under the following condition. That is, the adjacent diaphragm blades 7, 7 are arrayed at the interval of $2\pi/7$. As shown in FIG. 11, the first intersection c3 is an intersection of the arc-of-full-aperture-diameter Akh and the arc-guaranteeing-full-aperture-diameter Ahh. The second intersection c4 is an intersection of the arc-guaranteeing-full-aperture-diameter Ahh' and the arc Ahg. The angle between the line connecting the first intersection c3 with the origin Og of the arc Ahg and the line connecting the second intersection c4 with the origin Og of the arc Ahg is the angle G.

The condition 8) defines that the angle G is equal to or more than $2\pi/7$ ("7" is the number of the diaphragm blades 7).

In the above-mentioned step [5], the shape and the length of the front side of the inner periphery 7c are determined. The front side of the inner periphery 7c is in front of the portion, which has the form of the arc-of-predetermined-small-aperture-diameter Arm. As a result, near the full-aperture, the front portion (i.e., the portion, whose diameter is the same as the arc-of-full-aperture-diameter Akh) of the inner periphery 7c of one diaphragm blade 7 overlaps with the portion of the inner periphery 7c of the adjacent diaphragm blade 7, whose R (radius) is approximately the same as the R (radius) of the arc-of-full-aperture-diameter Akh.

As a result, it is possible to prevent the blade-step status of FIG. 9 from occurring.

Further, according to the step [5], the shape and the length of the front side of the inner periphery 7c are determined. In other words, the respective arcs are arranged such that the conditions 1) to 8) are met. At this time, the positions of the thirty-four arcs are determined uniquely. The thirty-four arcs are between the arc-of-full-aperture-diameter Akh and the arc-of-predetermined-small-aperture-diameter Arm, inclusive. That is, the position of the origin of each arc is determined relative to the origin Oc of the aperture 1a and the rotary shaft 7a.

At this time, the shapes of the two portions of the inner periphery 7c are determined finally. One is the portion, which has the form of the arc-of-predetermined-small-aperture-diameter Arm. The other is the front portion, which in front of the portion having the form of the arc-of-predetermined-small-aperture-diameter Arm. In view of this, in the next step [6], the shape of the rest portion of the inner periphery 7c is determined.

[6] The shape of the portion of the inner periphery 7c, which is at the rotary shaft 7a side, is defined finally. The portion at the rotary shaft 7a side is behind the portion having the form of the arc-of-predetermined-small-aperture-diameter Arm.

Specifically, an envelope is drawn. The envelope connects the arc-of-predetermined-small-aperture-diameter Arm, the arc-guaranteeing-full-aperture-diameter Ahh, and the respective arcs between them. The envelope is adopted as the shape of the portion of the inner periphery 7c, which is at the rotary shaft 7a side and behind the portion having the form of the arc-of-predetermined-small-aperture-diameter Arm.

Figure 12:
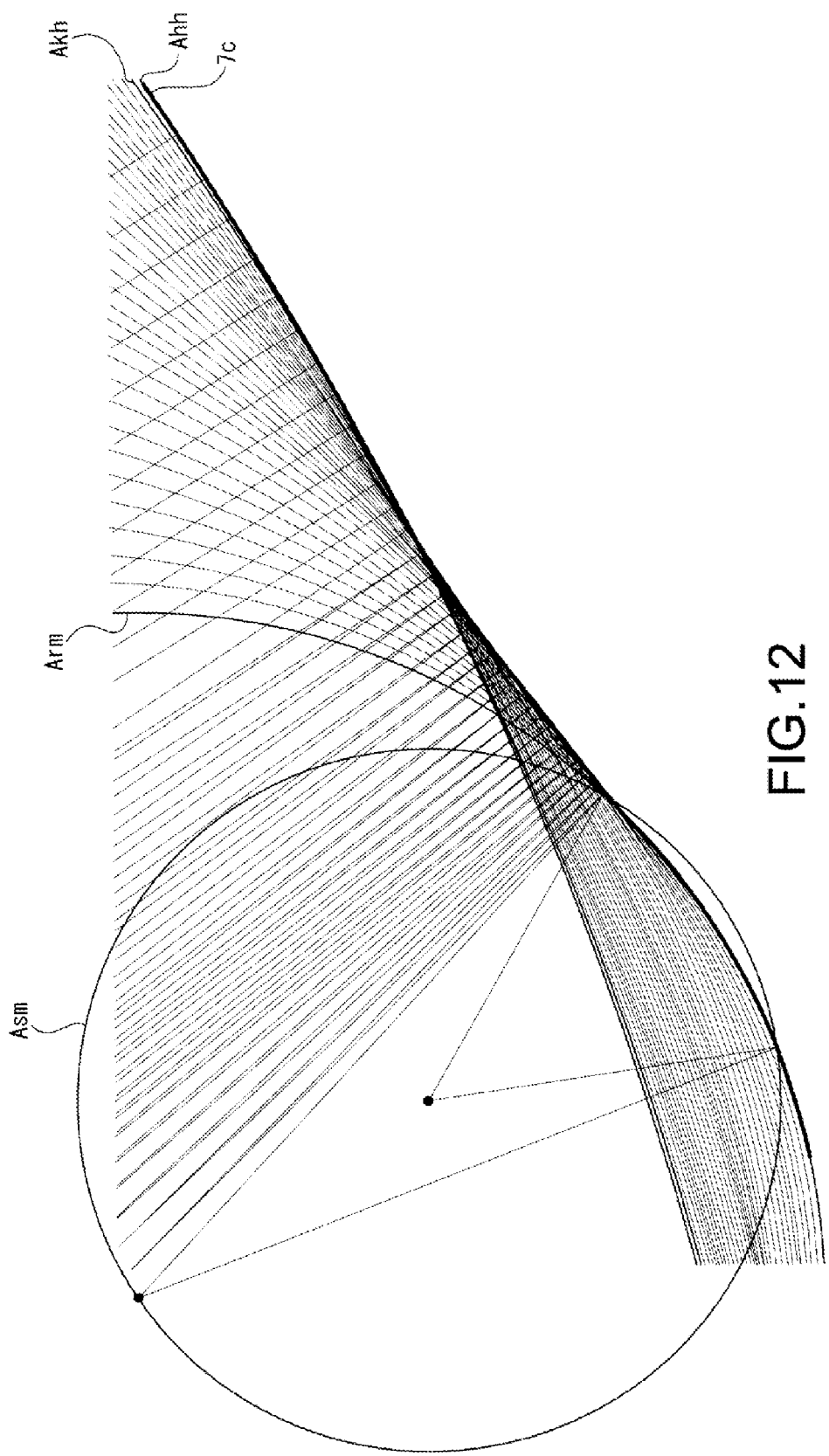
FIG. 12 is a diagram showing the respective arcs between the arc-guaranteeing-full-aperture-diameter and the arc-of-predetermined-small-aperture-diameter, the portion in the vicinity of the boundary between the respective arcs and the inner periphery being enlarged.

FIG. 12 is a diagram showing the respective arcs between the arc-guaranteeing-full-aperture-diameter Ahh and the arc-of-predetermined-small-aperture-diameter Arm. The portion in the vicinity of the boundary between the respective arcs and the inner periphery 7c is enlarged. Note that FIG. 12 also shows the arc-of-minimum-aperture-diameter Asm.

As shown in FIG. 12, in the vicinity of the boundary between the respective arcs and the inner periphery 7c, the respective arcs between the arc-guaranteeing-full-aperture-diameter Ahh and the arc-of-predetermined-small-aperture-diameter Arm are arrayed as follows. That is, the larger the diameter of the arc, the closer to the rotary shaft 7a.

Further, the portion of the inner periphery 7c, which is at the rotary shaft 7a side and behind the portion having the form of the arc-of-predetermined-small-aperture-diameter Arm, of each arc between the arc-guaranteeing-full-aperture-diameter Ahh and the arc-of-predetermined-small-aperture-diameter Arm intersects with the same portion of the inner periphery 7c of the adjacent arc. This is not shown in FIG. 12.

Note that the following relationship of the respective arcs is established in the case where the above-mentioned conditions 1) to 5) are met. That is, the larger the diameter of the arc, the closer to the rotary shaft 7a. In addition, each arc intersects with the adjacent arcs.

Figure 13:
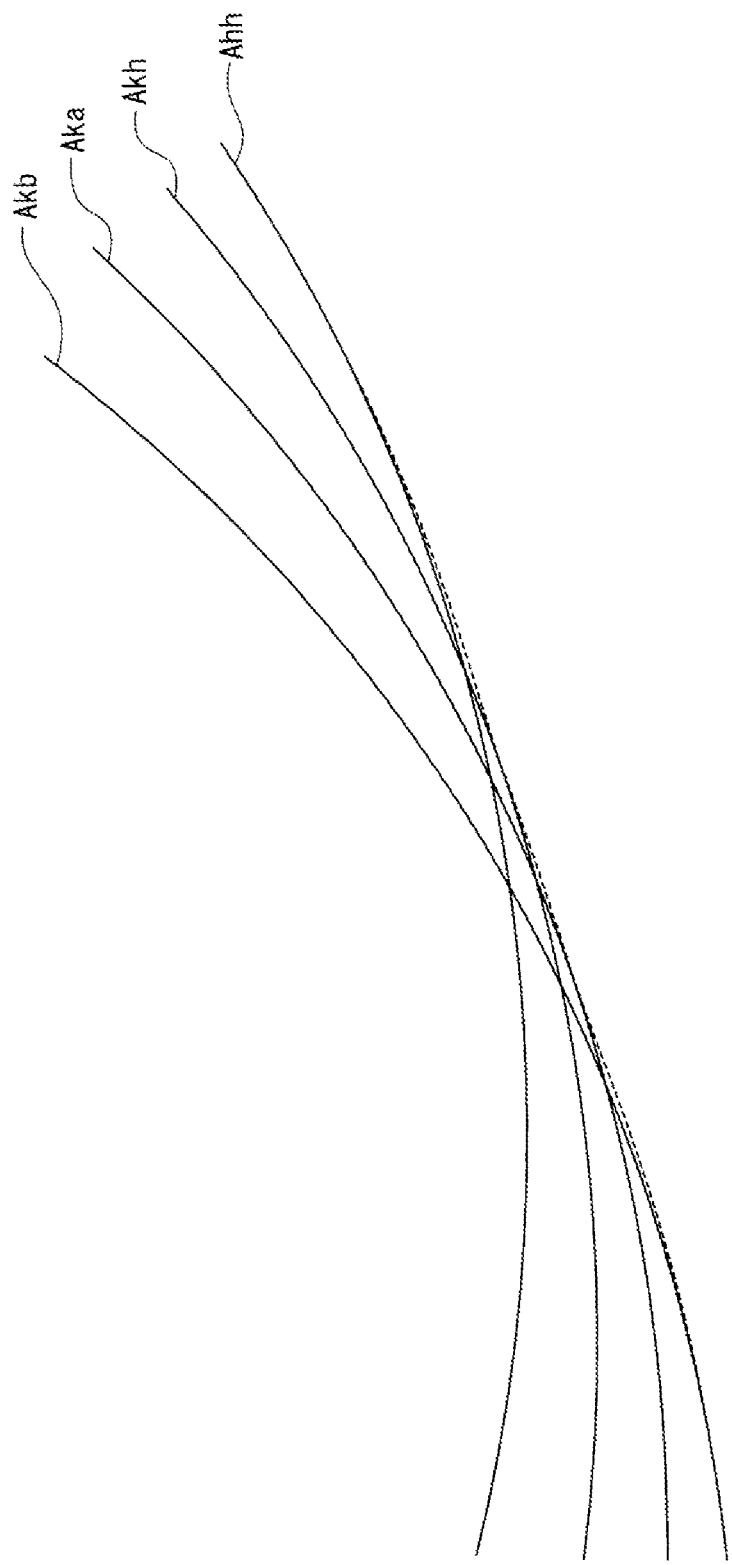
FIG. 13 is a diagram illustrating an envelope.

FIG. 13 is a diagram illustrating the envelope. The arc-guaranteeing-full-aperture-diameter Ahh, the arc-of-full-aperture-diameter Akh, an arc Aka, and an arc Akb are extracted from the respective arcs. The aperture-diameter of the arc Aka is reduced by 1/6 levels from the aperture-diameter of the arc Akh. The aperture-diameter of the arc Akb is reduced by 1/6 levels from the aperture-diameter of the arc Aka. FIG. 13 schematically shows the relation between those arcs and the envelope (dotted curve of FIG. 13).

A curve called envelope is the tangent line to each member of a given curve family. That is, a curve called envelope is tangent to all the given curves. In the step [6], as shown in FIG. 13, an envelope is illustrated. The envelope is tangent to the arc-of-predetermined-small-aperture-diameter Arm, the arc-guaranteeing-full-aperture-diameter Ahh, and the arcs arranged between them. Further, the envelope is adopted as the shape of the portion of the inner periphery 7c, which is at the side of the rotary shaft 7a and behind the portion having the form of the arc-of-predetermined-small-aperture-diameter Arm.

As a result, the shape of the portion of the inner periphery 7c, which is used between the full-aperture and the minimum-aperture is determined.

Here, if the circle-radius-ratio is only focused on, it is not necessary to dare to draw the above-mentioned envelope. However, let's assume that the shapes of the ridges (outer peripheries) of the respective arcs, whose positions are determined in the steps [1] to [5], are adopted as they are as the shape of the inner periphery 7c. In this case, the apparent degree of circularity is degraded. It will produce an undesirable result. In view of this, according to the embodiment, the shape of the envelope connecting the respective arcs is adopted as the shape of the inner periphery 7c.

Figure 14:
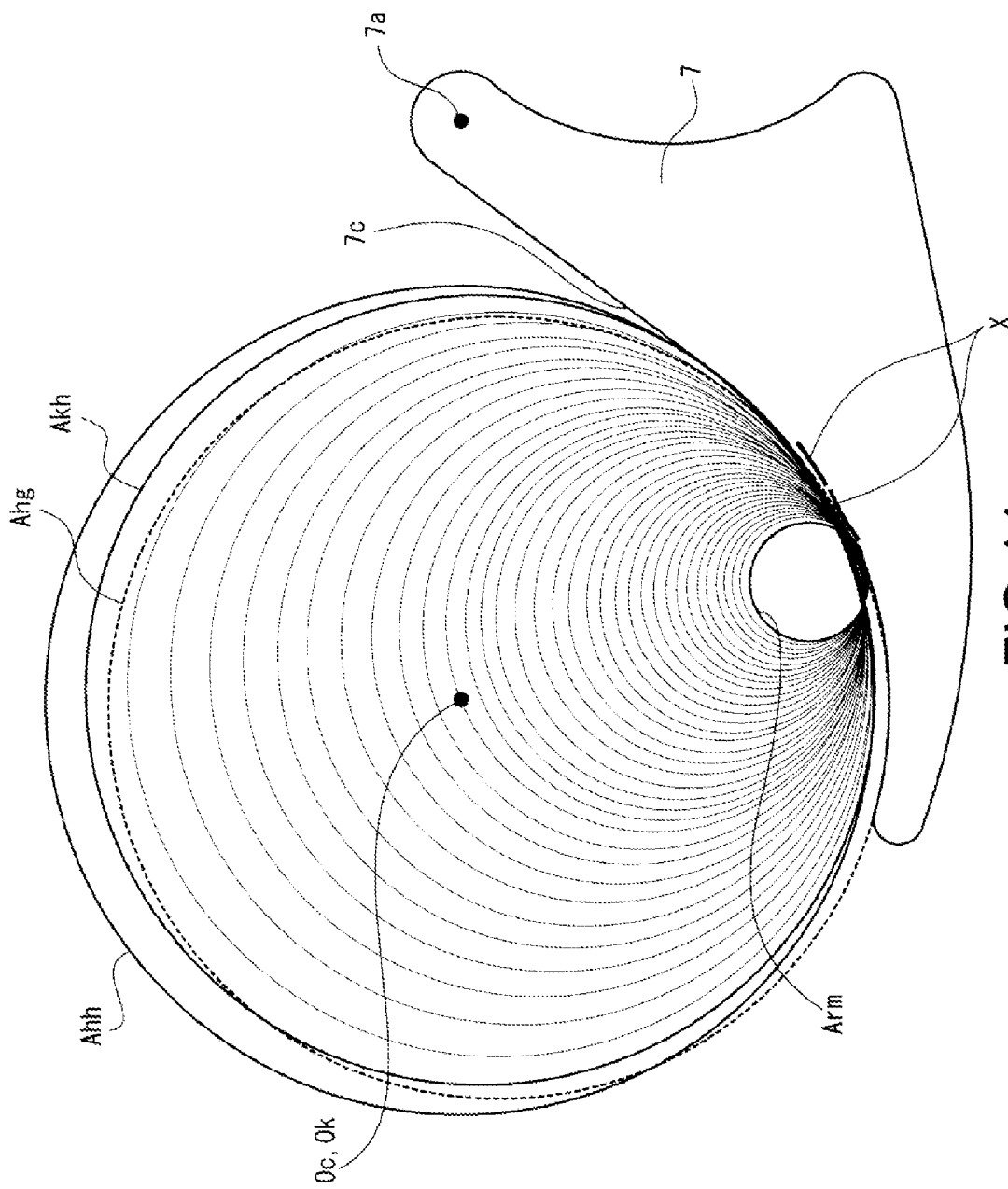
FIG. 14 is a diagram illustrating the shape of the inner periphery determined based on the steps [1] to [6]

The shape of the inner periphery 7c is determined based on the steps [1] to [6]. FIG. 14 is a diagram illustrating the shape of the inner periphery 7c.

As shown in the two thick lines X of FIG. 14, the following two portions are formed on a part of the portion of the inner periphery 7c, whose shape is determined based on the step [6]. The R (radius) of the shape of one portion is at the opposite side of the R (radius) of the shape of the other portion. Specifically, the portions, which have the shapes having the opposite Rs (radii), respectively, are formed in the vicinity of the boundary between the following two portions. One portion has the form of the arc-of-predetermined-small-aperture-diameter Arm. The other portion is at the rotary shaft 7a side and behind the one portion. In the opposite Rs (radii), the origin of one R (radius), which is closer to the rotary shaft 7a, is positioned at the side of the origin Oc of the aperture 1a. The origin of the other R (radius) is positioned at the side of the outer periphery (portion opposite to the inner periphery 7c) of the diaphragm blade 7.

One R (radius) is opposite to the other R (radius) because of the following reason. That is, the portion of the inner periphery 7c, which is used to form the minimum-aperture, has the form of a portion (above-mentioned minor arc) of the arc-of-predetermined-small-aperture-diameter Arm. The respective arcs between the arc-of-predetermined-small-aperture-diameter Arm and the arc-guaranteeing-full-aperture-diameter Ahh are connected smoothly.

Note that, as described above, the relationship between the respective arcs (illustrated in FIG. 12 and FIG. 13) is established in the case where the above-mentioned conditions 1) to 5) are met. That is, the formation of the portions, which have the shapes having the opposite Rs (radii), respectively, does not result from the step [5]. In the step [5], the positions of the respective arcs are defined uniquely. Such portions are formed also in the case where the positions of the respective arcs are defined uniquely based on a step different from the step [5].

Here, in the steps [1] to [6], the design procedure of the shape of the portion of the inner periphery 7c, which is used to form the aperture between the full-aperture and the minimum-aperture is described. A shape, which is appropriate for an actual embodiment and the like, may be adopted arbitrarily as the shape of the portion of the inner periphery 7c, which is not used to form the aperture between the full-aperture and the minimum-aperture.

[1-3. Conclusion and Effects]

As described above, according to the embodiment, a diaphragm unit 1 includes a plurality of diaphragm blades 7, 7, . . . structured to at least rotate, the plurality of diaphragm blades 7, 7, . . . being capable of changing an area of an aperture 1a, each of the diaphragm blades 7 including portions on a part of an inner periphery 7c, a R (radius) of a shape of one portion being at the opposite side of a R (radius) of a shape of the other portion.

Because of the portions, which have the shapes having the opposite Rs (radii), respectively, it is possible to smoothly connect the following two portions of the inner periphery 7c. One arc portion has a smaller radius, and is used near the minimum-aperture (in this example, the portion, which has the form of the arc-of-predetermined-small-aperture-diameter Arm). The other portion is used to form an aperture closer to the full-aperture.

Here, let's assume that it is required to increase the circle-radius-ratio of the shape of the aperture 1a near the minimum-aperture. In this case, it is favorable that the portion of the inner periphery 7c, which is used near the minimum-aperture, has the form of an arc having a smaller radius corresponding to the minimum-aperture-diameter. Meanwhile, the more the diaphragm is opened, the more the portion of the inner periphery 7c, which is used, is enlarged. In view of this, the average R (radius) of the portion, which extends from the arc of the smaller radius, should be relatively larger. As described above, the portions, which have the shapes having the opposite Rs (radii), are capable of smoothly connecting the following two portions. One arc portion is used near the minimum-aperture. The other portion is used to form an aperture closer to the full-aperture. In view of this, according to the diaphragm unit 1 of the embodiment, both the circle-radius-ratio at the minimum-aperture side and the circle-radius-ratio at the full-aperture side are increased. In addition, the circle-radius-ratio is always high between the minimum-aperture and the full-aperture. That is, the aperture range, whose circle-radius-ratio is always high, may be enlarged in comparison to the related art.

Further, according to the embodiment, one of the portion whose shape has the opposite R (radius) has a form of an envelope, the envelope connecting a plurality of arcs, diameters of the plurality of arcs being the same as aperture-diameters between a full-aperture-diameter and a predetermined-small-aperture-diameter, inclusive.

The respective arcs are connected smoothly because the envelope is used. As a result, the circle-radius-ratio is always high in the predetermined aperture range. At the same time, it is possible to increase the apparent degree of circularity of the aperture 1a of each aperture level.

Further, according to the embodiment, a portion of the inner periphery 7c has a form of a part of an arc (in the example, arc-of-predetermined-small-aperture-diameter Arm), the portion being used to form the aperture 1a in a case where a minimum-aperture is formed, the origin of the arc being on another arc Arr, the origin of the latter arc Arr being a rotary shaft 7a of the diaphragm blade 7 including the inner periphery 7c, the radius of the latter arc Arr being the same as the distance between the rotary shaft 7a and the origin Oc of the aperture 1a.

As a result, the portion of the inner periphery 7c, which is used near the minimum-aperture, is nearly circular. The shape of the aperture is always nearly circular near the minimum-aperture. That is, it is possible to increase the circle-radius-ratio near the minimum-aperture.

Further, according to the embodiment, a portion of the inner periphery 7c has a form of a minor arc of an arc-of-predetermined-small-aperture-diameter Arm, the portion being used to form the aperture 1a in a case where a minimum-aperture is formed, where the number of the diaphragm blades 7 is m, an arc-of-minimum-aperture-diameter Asm is an arc having a diameter, the diameter being the same as a diameter of the aperture 1a in a case where a minimum-aperture is formed, and the arc-of-predetermined-small-aperture-diameter Arm is an arc having a diameter larger than the diameter of the arc-of-minimum-aperture-diameter Asm, the arc having a predetermined circle-radius-ratio to the arc-of-minimum-aperture-diameter Asm, and where the arc-of-minimum-aperture-diameter Asm and the arc-of-predetermined-small-aperture-diameter Arm are arranged under conditions including the origin of the arc-of-minimum-aperture-diameter Asm and the origin of the arc-of-predetermined-small-aperture-diameter Arm are on an arc Arr, the origin of the arc Arr being a rotary shaft 7a of the diaphragm blade 7 including the inner periphery 7c, the radius of the arc Arr being the same as the distance between the rotary shaft 7a and the origin Oc of the aperture 1a, the arc-of-minimum-aperture-diameter Asm intersects with the arc-of-predetermined-small-aperture-diameter Arm at two intersections c1 and c2, and a central angle of the minor arc of the arc-of-predetermined-small-aperture-diameter Arm formed between the two intersections c1 and c2 is $\pi/m$, and a central angle of a minor arc of the arc-of-minimum-aperture-diameter Asm formed between the two intersections c1 and c2 is $2\pi/m$.

As a result, in the case where the minimum-aperture is formed, the aperture 1a is formed only by combining the following portions of the respective diaphragm blades 7. That is, each portion has the form of the minor arc of the arc-of-predetermined-small-aperture-diameter Arm.

The portion, which is used in the case where the minimum-aperture is formed, has the form of the arc having the smaller diameter corresponding to the minimum-aperture-diameter. As a result, it is possible to increase the circle-radius-ratio in the case where the minimum-aperture is formed.

In addition, according to the embodiment, a portion of the inner periphery 7c has a form of a part of an arc-of-predetermined-small-aperture-diameter Arm, the portion being used to form the aperture 1a in a case where a minimum-aperture is formed, the origin of the arc-of-predetermined-small-aperture-diameter Arm being on an arc Arr, the origin of the arc Arr being a rotary shaft 7a of the diaphragm blade 7 including the inner periphery 7c, the radius of the arc Arr being the same as the distance between the rotary shaft 7a and the origin Oc of the aperture 1a, and a portion of the inner periphery 7c has a shape connecting arcs between an arc-of-full-aperture-diameter Akh and the arc-of-predetermined-small-aperture-diameter Arm, inclusive, the portion being at a side of the rotary shaft 7a and behind a portion having a form of the arc-of-predetermined-small-aperture-diameter Arm, the arcs being arrayed under a condition that the arc-of-predetermined-small-aperture-diameter Arm is inscribed in a concentric circle Akd of the arc-of-full-aperture-diameter Akh, a difference between the diameter of the concentric circle Akd and the diameter of the arc-of-full-aperture-diameter Akh is equal to or smaller than a predetermined value, where an arc-of-minimum-aperture-diameter Asm is an arc having a diameter, the diameter being the same as the diameter of the aperture 1a in a case where a minimum-aperture is formed, the arc-of-full-aperture-diameter Akh is an arc having a diameter, the diameter being the same as the diameter of the aperture 1a in a case where a full-aperture is formed, and the arc-of-predetermined-small-aperture-diameter Arm is an arc having a diameter, the diameter being larger than the diameter of the arc-of-minimum-aperture-diameter Asm, the arc having a predetermined circle-radius-ratio to the arc-of-minimum-aperture-diameter Asm.

As a result, the circle-radius-ratio of the aperture 1a in the case where the full-aperture is formed is the same as the diameter-ratio between the arc-of-full-aperture-diameter Akh and its concentric circle Akd.

That is, the diameter-ratio between the arc-of-full-aperture-diameter Akh and its concentric circle Akd is determined to be equal to or smaller than the expected circle-radius-ratio. As a result, the circle-radius-ratio of the aperture 1a in the case where the full-aperture is formed may be equal to or smaller the expected circle-radius-ratio.

Further, according to the embodiment, a shape of a portion of the inner periphery 7c has a form of a part of a blade-step-preventing-arc Ahg, the portion being in front of a portion having a form of the arc-of-predetermined-small-aperture-diameter Arm, and a length of the portion of the inner periphery 7c having the form of the part of the blade-step-preventing-arc Ahg is determined under a condition that an angle between two lines is equal to or larger than $2\pi/m$, one line connecting a first intersection c3 with the origin Og of the blade-step-preventing-arc Ahg, the other line connecting a second intersection c4 and the origin Og of the blade-step-preventing-arc Ahg.

As a result, near the full-aperture, the front portion (i.e., portion whose diameter is the same as the diameter of the arc-of-full-aperture-diameter Akh) of the inner periphery 7c of one diaphragm blade 7 overlaps with a portion (i.e., portion whose R (radius) is approximately the same as the R (radius) of the arc-of-full-aperture-diameter Akh) of the inner periphery 7c of the adjacent diaphragm blade 7.

As a result, it is possible to prevent the blade-step status of FIG. 9 from occurring.

Figure 15:
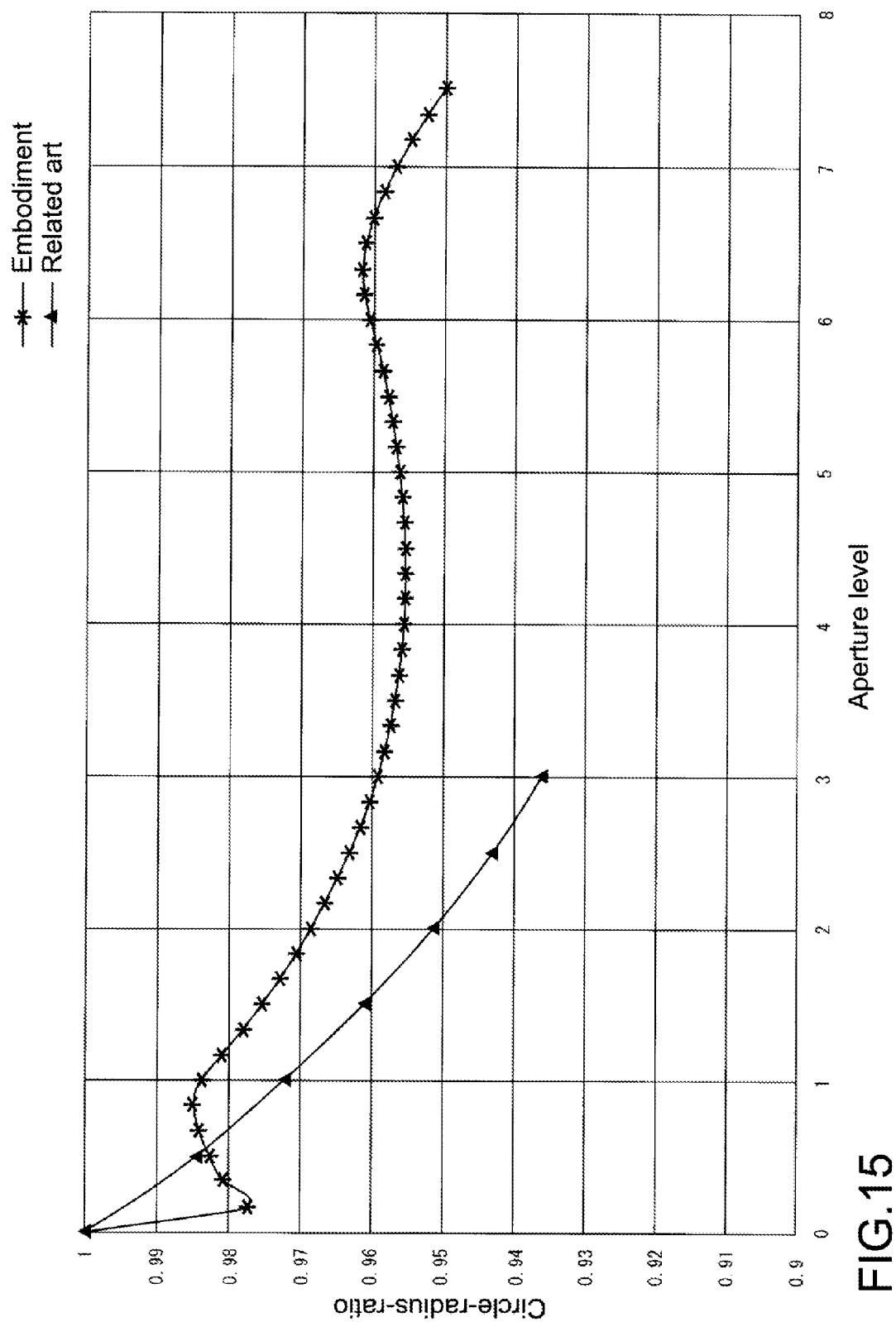
FIG. 15 shows the result of the calculated circle-radius-ratios from the full-aperture to the minimum-aperture.
Figure 16B:
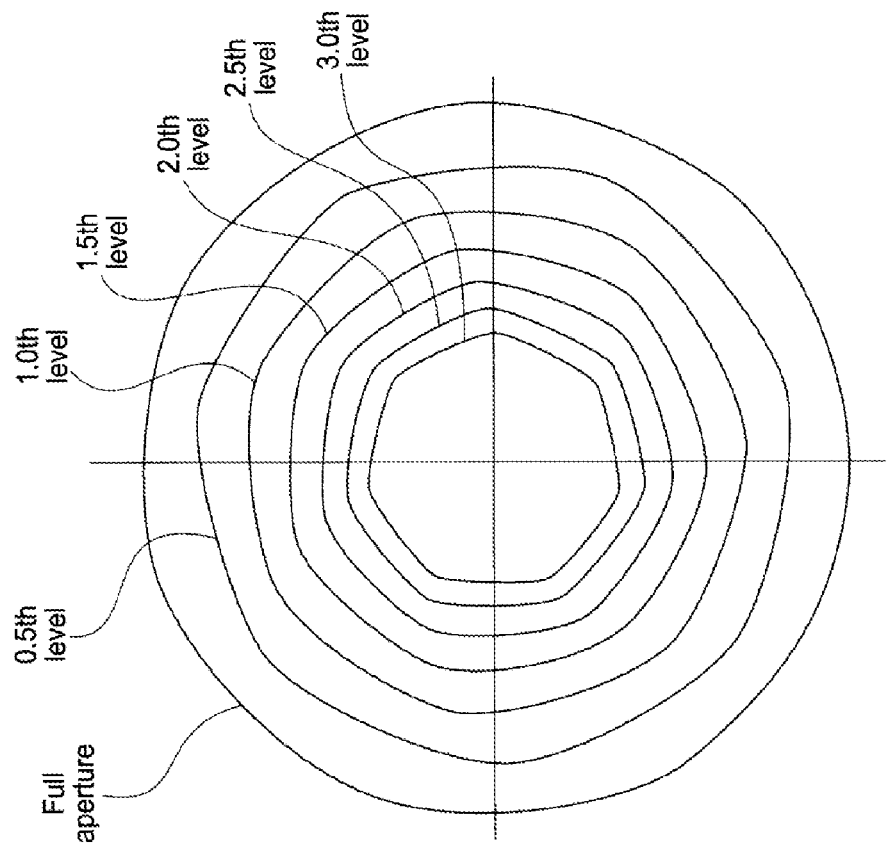
FIGS. 16A and 16B show the shapes of the aperture at the respective aperture levels.
Figure 16A:
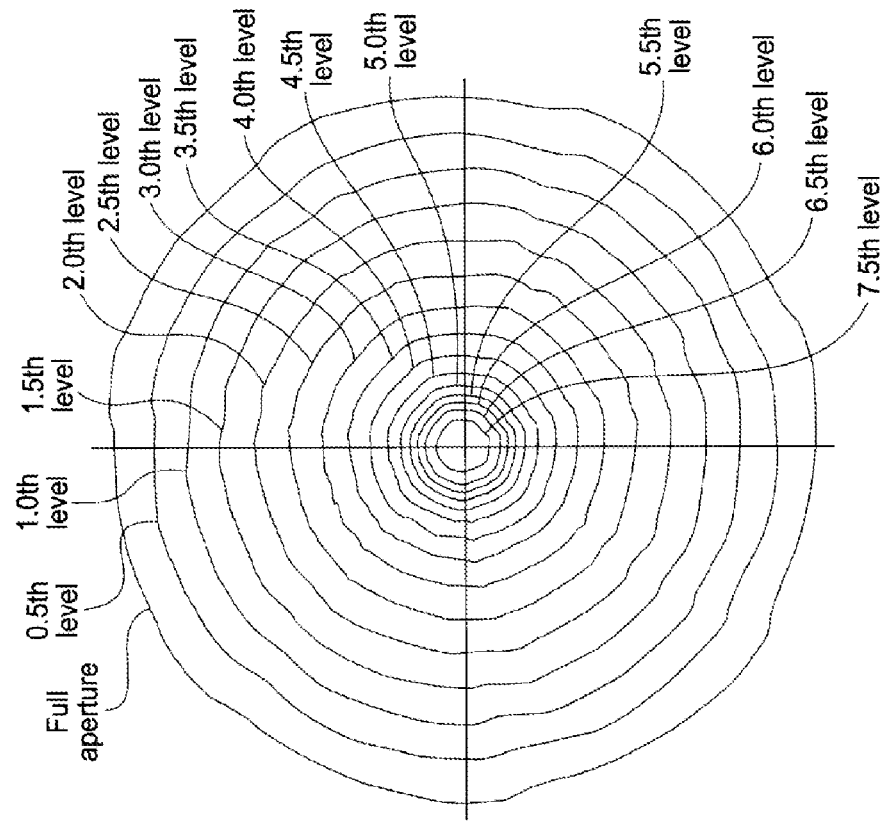

FIG. 15 shows the result of the calculated circle-radius-ratios from the full-aperture to the minimum-aperture. FIGS. 16A and 16B show the shapes of the aperture 1a at the respective aperture levels. Note that, in FIG. 15, the asterisks show the calculated result of the diaphragm unit 1 of the embodiment. The triangles show the calculated result of a diaphragm unit of a related art as a comparative example.

Further, FIG. 16A shows the shapes of the aperture 1*a* of the diaphragm unit 1 at the respective aperture levels. Note that the shape of the aperture narrower than the full-aperture-diameter by 7.0 levels is not shown to make the drawing more visible. FIG. 16B shows the shapes of the aperture of a diaphragm unit of a related art at the respective aperture levels as a comparative example.

As confirmed with the result of FIG. 15, according to the diaphragm unit 1 of the embodiment, the expected circle-radius-ratio (0.95 in this example) is always attained between the full-aperture and the aperture narrower than the full-aperture by 7.5 levels. Note that, according to the diaphragm unit of the related art, after the aperture is reduced by 2.0 levels from the full-aperture, the circle-radius-ratio is always lower than 0.95.

Further, as confirmed in FIG. 16B, according to the related art, the shape of the aperture 1*a* is nearly heptagonal in the case where the aperture is reduced by 0.5 levels from the full-aperture and thereafter. To the contrary, as confirmed in FIG. 16A, according to the embodiment, every aperture between the full-aperture and the minimum-aperture does not have a simple polygonal shape. Every aperture has a complicate shape. The apparent degree of circularity is always high.

<2. Lens Apparatus and Image Pickup Apparatus>

Figure 17A:
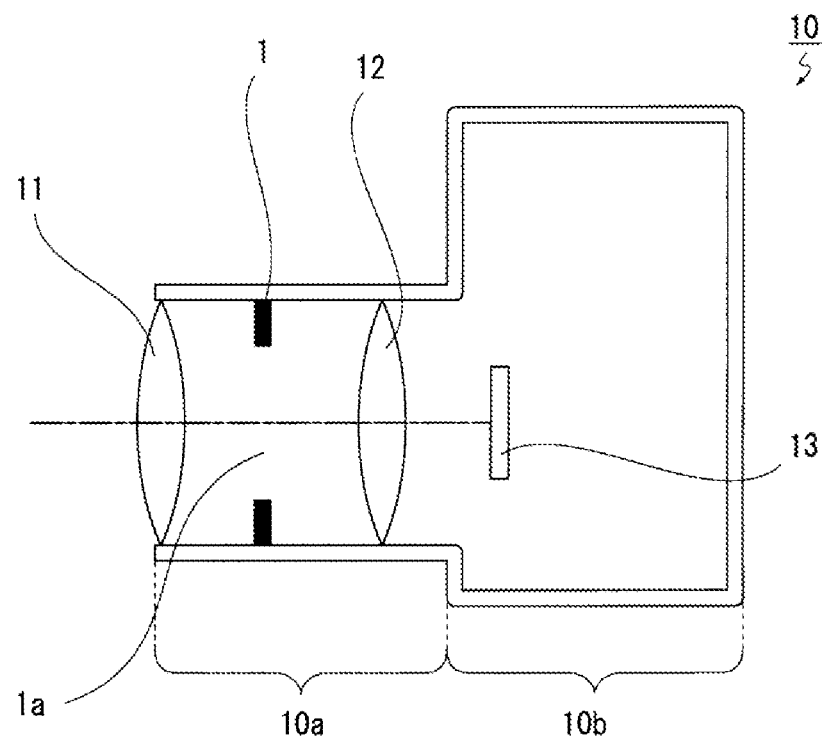
FIG. 17A is a sectional view schematically showing an image pickup apparatus of the embodiment.
Figure 17B:
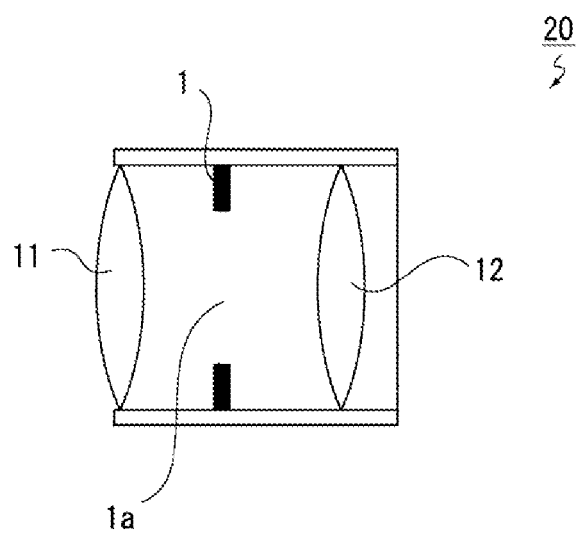
FIG. 17B is a sectional view schematically showing a lens apparatus of the embodiment.

FIG. 17A is a sectional view schematically showing the image pickup apparatus 10 of the embodiment. FIG. 17B is a sectional view schematically showing the lens apparatus 20 of the embodiment.

As shown in FIG. 17A, the image pickup apparatus 10 of the embodiment includes the lens unit 10*a* and the main body unit 10*b*. The image pickup lens 11, the diaphragm unit 1, and the lens 12 are arrayed in the lens unit 10*a*. The main body unit 10*b* includes the image pickup device 13. For example, the image pickup device 13 is a CCD (Charge Coupled Device) sensor, a CMOS (Complementary Metal-Oxide Semiconductor) sensor, or the like. The image pickup lens 11 collects light from an object (object light). The image pickup lens 11 guides the object light to the aperture 1*a* of the diaphragm unit 1. The object light enters the aperture 1*a*. The lens 12 collects the object light. The lens 12 forms an image on the imaging area of the image pickup device 13. The image pickup device 13 receives the object light, and obtains an imaging signal.

The structure of the lens apparatus 20 of the embodiment of FIG. 17B is approximately the same as the structure of the lens unit 10*a* of the image pickup apparatus 10 of FIG. 17A. Note that the lens apparatus 20 is different from the lens unit 10*a* in the following point. That is, the lens apparatus 20 is a so-called interchangeable lens. The lens apparatus 20 can be detached from a predetermined image pickup apparatus.

<3. Examples of Modification>

The embodiment of the present technology has been described above. The present technology shall not be limited to the above-mentioned specific example. Various examples of modification shall be adopted.

For example, in the above-mentioned example, there are seven diaphragm blades 7. However, the number of the diaphragm blades 7 shall not be limited to seven. For example, there may be nine diaphragm blades 7. In this case, in the above-mentioned condition 3) of the step [3] and the above-mentioned condition 8) of the step [5], the number (m) of the diaphragm blades 7 is "9".

Here, let's say that the number of the diaphragm blades 7 is increased. In this case, it is possible to prevent the size of the diaphragm blade 7 from being increased in the case where a lens apparatus (lens apparatus that has a larger f-number and is bright), whose aperture-diameter is larger, is realized. As a result, it is possible to prevent the size of the diaphragm unit 1 from being increased.

Further, in the above-mentioned example, the cam grooves 6*a*, 6*a*, . . . are formed on the blade cap 6. The drive shafts 7*b*, 7*b*, . . . of the diaphragm blades 7, 7, , . . . are inserted in the cam grooves 6*a*, 6*a*, . . . . The rotary-shaft insertion holes 3*a*, 3*a*, , . . . are formed on the actuating ring 3. The rotary shafts 7*a*, 7*a*, . . . are inserted in the rotary-shaft insertion holes 3*a*, 3*a*, . . . . The diaphragm blades 7, 7, . . . travel (revolve) and rotate (rotate around the shafts) as the actuating ring 3 rotates. Alternatively, the following structure may be adopted. That is, cam grooves are formed on the actuating ring 3. The drive shafts 7*b*, 7*b*, . . . are inserted in the cam grooves. Rotary-shaft insertion holes are formed on the blade cap. The rotary shafts 7*a*, 7*a*, . . . are inserted in the rotary-shaft insertion holes. The diaphragm blades 7, 7, . . . only rotate around the shafts as the actuating ring 3 rotates. That is, the present technology is applicable to a diaphragm unit, which is structured as follows. That is, diaphragm blades at least rotate to thereby change the area of an aperture.

<4. Present Technology>

Note that, the present technology may employ the following structures:

(1) A diaphragm unit, comprising:
    a plurality of diaphragm blades structured to at least rotate, the plurality of diaphragm blades being capable of changing an area of an aperture, each of the diaphragm blades including portions on a part of an inner periphery, a R (radius) of a shape of one portion being at the opposite side of a R (radius) of a shape of the other portion, the inner periphery being a periphery forming an outer periphery of the aperture.

(2) The diaphragm unit according to (1), wherein
    one of the portion whose shape has the opposite R (radius) has a form of an envelope, the envelope connecting a plurality of arcs, diameters of the plurality of arcs being the same as aperture-diameters between a full-aperture-diameter and a predetermined-small-aperture-diameter, inclusive.

(3) The diaphragm unit according to (1) or (2), wherein
    a portion of the inner periphery has a form of a part of an arc, the portion being used to form the aperture in a case where a minimum-aperture is formed, the origin of the arc being on another arc, the origin of the latter arc being a rotary shaft of the diaphragm blade including the inner periphery, the radius of the latter arc being the same as the distance between the rotary shaft and the origin of the aperture.

(4) The diaphragm unit according to any one of (1) to (3), wherein
    a portion of the inner periphery has a form of a minor arc of an arc-of-predetermined-small-aperture-diameter, the portion being used to form the aperture in a case where a minimum-aperture is formed, where
    the number of the diaphragm blades is m,
    an arc-of-minimum-aperture-diameter is an arc having a diameter, the diameter being the same as a diameter of the aperture in a case where a minimum-aperture is formed, and
    the arc-of-predetermined-small-aperture-diameter is an arc having a diameter larger than the diameter of the arc-of-minimum-aperture-diameter, the arc having a predetermined circle-radius-ratio to the arc-of-minimum-aperture-diameter, and where the arc-of-minimum-aperture-diameter and the arc-of-predetermined-small-aperture-diameter are arranged under conditions including the origin of the arc-of-minimum-aperture-diameter and the origin of the arc-of-predetermined-small-aperture-diameter are on an arc, the origin of the arc being a rotary shaft of the diaphragm blade including the inner periphery, the radius of the arc being the same as the distance between the rotary shaft and the origin of the aperture, the arc-of-minimum-aperture-diameter intersects with the arc-of-predetermined-small-aperture-diameter at two intersections, and a central angle of the minor arc of the arc-of-predetermined-small-aperture-diameter formed between the two intersections is n/m, and a central angle of a minor arc of the arc-of-minimum-aperture-diameter formed between the two intersections is $2\pi/m$.

(5) The diaphragm unit according to any one of (1) to (4), wherein a portion of the inner periphery has a form of a part of an arc-of-predetermined-small-aperture-diameter, the portion being used to form the aperture in a case where a minimum-aperture is formed, the origin of the arc-of-predetermined-small-aperture-diameter being on an arc, the origin of the arc being a rotary shaft of the diaphragm blade including the inner periphery, the radius of the arc being the same as the distance between the rotary shaft and the origin of the aperture, and a portion of the inner periphery has a shape connecting arcs between an arc-of-full-aperture-diameter and the arc-of-predetermined-small-aperture-diameter, inclusive, the portion being at a side of the rotary shaft and behind a portion having a form of the arc-of-predetermined-small-aperture-diameter, the arcs being arrayed under a condition that the arc-of-predetermined-small-aperture-diameter is inscribed in a concentric circle of the arc-of-full-aperture-diameter, a difference between the diameter of the concentric circle and the diameter of the arc-of-full-aperture-diameter is equal to or smaller than a predetermined value, where an arc-of-minimum-aperture-diameter is an arc having a diameter, the diameter being the same as the diameter of the aperture in a case where a minimum-aperture is formed, the arc-of-full-aperture-diameter is an arc having a diameter, the diameter being the same as the diameter of the aperture in a case where a full-aperture is formed, and the arc-of-predetermined-small-aperture-diameter is an arc having a diameter, the diameter being larger than the diameter of the arc-of-minimum-aperture-diameter, the arc having a predetermined circle-radius-ratio to the arc-of-minimum-aperture-diameter.

(6) The diaphragm unit according to claim 5), wherein a shape of a portion of the inner periphery has a form of a part of a blade-step-preventing-arc, the portion being in front of a portion having a form of the arc-of-predetermined-small-aperture-diameter, and a length of the portion of the inner periphery having the form of the part of the blade-step-preventing-arc is determined under a condition that an angle between two lines is equal to or larger than $2\pi/m$, one line connecting a first intersection with the origin of the blade-step-preventing-arc, the other line connecting a second intersection and the origin of the blade-step-preventing-arc, where the number of the diaphragm blades is m, an arc-guaranteeing-full-aperture-diameter is an arc having a diameter larger than the diameter of the arc-of-full-aperture-diameter, the arc being arranged such that the origin of the arc being on the origin of the aperture, the blade-step-preventing-arc is an arc having a diameter, the diameter being the same as the diameter of the arc-of-full-aperture-diameter, the arc being tangential to the arc-of-predetermined-small-aperture-diameter, the first intersection is one of intersections of the arc-of-full-aperture-diameter and the arc-guaranteeing-full-aperture-diameter, the one intersection is positioned at a side of the rotary shaft, and the second intersection is one of intersections of an arc-guaranteeing-full-aperture-diameter of a diaphragm blade and the blade-step-preventing-arc, the diaphragm blade being adjacent to a front side of another diaphragm blade, the front side being opposite to the rotary shaft, the one intersection being positioned at the front side.

It should be understood by those skilled in the art that various modifications, combinations, sub-combinations and alterations may occur depending on design requirements and other factors insofar as they are within the scope of the appended claims or the equivalents thereof.

What is claimed is:

1. A diaphragm unit, comprising:

a plurality of diaphragm blades structured to at least rotate, the plurality of diaphragm blades being capable of changing an area of an aperture, each of the diaphragm blades including portions on a part of an inner periphery, a radius of a shape of one portion being at the opposite side of a radius of a shape of the other portion, the inner periphery being a periphery forming an outer periphery of the aperture, wherein the one portion whose shape has the opposite radius has a form of an envelope, wherein the envelope is a tangent to each of a plurality of arcs, diameters of the plurality of arcs being the same as aperture-diameters between a full-aperture-diameter and a predetermined-small-aperture-diameter, inclusive.

2. The diaphragm unit according to claim 1, wherein a portion of the inner periphery has a form of a part of an arc, the portion being used to form the aperture in a case where a minimum-aperture is formed, the origin of the arc being on another arc, the origin of the latter arc being a rotary shaft of the diaphragm blade including the inner periphery, the radius of the latter arc being the same as the distance between the rotary shaft and the origin of the aperture.

3. The diaphragm unit according to claim 1, wherein a portion of the inner periphery has a form of a minor arc of an arc-of-predetermined-small-aperture-diameter, the portion being used to form the aperture in a case where a minimum-aperture is formed, where the number of the diaphragm blades is m, an arc-of-minimum-aperture-diameter is an arc having a diameter, the diameter being the same as a diameter of the aperture in a case where a minimum-aperture is formed, and the arc-of-predetermined-small-aperture-diameter is an arc having a diameter larger than the diameter of the arc-of-minimum-aperture-diameter, the arc having a predetermined circle-radius-ratio to the arc-of-minimum-aperture-diameter, and where the arc-of-minimum-aperture-diameter and the arc-of-predetermined-small-aperture-diameter are arranged under conditions including the origin of the arc-of-minimum-aperture-diameter and the origin of the arc-of-predetermined-small-aperture-diameter are on an arc, the origin of the arc being a rotary shaft of the diaphragm blade including the inner periphery, the radius of the arc being the same as the distance between the rotary shaft and the origin of the aperture, the arc-of-minimum-aperture-diameter intersects with the arc-of-predetermined-small-aperture-diameter at two intersections, and a central angle of the minor arc of the arc-of-predetermined-small-aperture-diameter formed between the two intersections is $\pi/m$, and a central angle of a minor arc of the arc-of-minimum-aperture-diameter formed between the two intersections is $2\pi/m$.

4. The diaphragm unit according to claim 1, wherein a portion of the inner periphery has a form of a part of an arc-of-predetermined-small-aperture-diameter, the portion being used to form the aperture in a case where a minimum-aperture is formed, the origin of the arc-of-predetermined-small-aperture-diameter being on an arc, the origin of the arc being a rotary shaft of the diaphragm blade including the inner periphery, the radius of the arc being the same as the distance between the rotary shaft and the origin of the aperture, and a portion of the inner periphery has a shape connecting arcs between an arc-of-full-aperture-diameter and the arc-of-predetermined-small-aperture-diameter, inclusive, the portion being at a side of the rotary shaft and behind a portion having a form of the arc-of-predetermined-small-aperture-diameter, the arcs being arrayed under a condition that the arc-of-predetermined-small-aperture-diameter is inscribed in a concentric circle of the arc-of-full-aperture-diameter, a difference between the diameter of the concentric circle and the diameter of the arc-of-full-aperture-diameter is equal to or smaller than a predetermined value, where an arc-of-minimum-aperture-diameter is an arc having a diameter, the diameter being the same as the diameter of the aperture in a case where a minimum-aperture is formed, the arc-of-full-aperture-diameter is an arc having a diameter, the diameter being the same as the diameter of the aperture in a case where a full-aperture is formed, and the arc-of-predetermined-small-aperture-diameter is an arc having a diameter, the diameter being larger than the diameter of the arc-of-minimum-aperture-diameter, the arc having a predetermined circle-radius-ratio to the arc-of-minimum-aperture-diameter.

5. The diaphragm unit according to claim 4, wherein a shape of a portion of the inner periphery has a form of a part of a blade-step-preventing-arc, the portion being in front of a portion having a form of the arc-of-predetermined-small-aperture-diameter, and a length of the portion of the inner periphery having the form of the part of the blade-step-preventing-arc is determined under a condition that an angle between two lines is equal to or larger than $2\pi/m$, one line connecting a first intersection with the origin of the blade-step-preventing-arc, the other line connecting a second intersection and the origin of the blade-step-preventing-arc, where the number of the diaphragm blades is m, an arc-guaranteeing-full-aperture-diameter is an arc having a diameter larger than the diameter of the arc-of-full-aperture-diameter, the arc being arranged such that the origin of the arc being on the origin of the aperture, the blade-step-preventing-arc is an arc having a diameter, the diameter being the same as the diameter of the arc-of-full-aperture-diameter, the arc being tangential to the arc-of-predetermined-small-aperture-diameter, the first intersection is one of intersections of the arc-of-full-aperture-diameter and the arc-guaranteeing-full-aperture-diameter, the first intersection is positioned at a side of the rotary shaft, and the second intersection is one of intersections of an arc-guaranteeing-full-aperture-diameter of a diaphragm blade and the blade-step-preventing-arc, the diaphragm blade being adjacent to a front side of another diaphragm blade, the front side being opposite to the rotary shaft, the second intersection being positioned at the front side.

6. A lens apparatus, comprising:

a diaphragm unit including a plurality of diaphragm blades structured to at least rotate, the plurality of diaphragm blades being capable of changing an area of an aperture, each of the diaphragm blades including portions on a part of an inner periphery, a radius of a shape of one portion being at the opposite side of a radius of a shape of the other portion, the inner periphery being a periphery forming an outer periphery of the aperture, wherein the one portion whose shape has the opposite radius has a form of an envelope, wherein the envelope is a tangent to each of a plurality of arcs, diameters of the plurality of arcs being the same as aperture-diameters between a full-aperture-diameter and a predetermined-small-aperture-diameter, inclusive; and an image pickup lens configured to guide object light to the aperture of the diaphragm unit.

7. An image pickup apparatus, comprising:

a diaphragm unit including a plurality of diaphragm blades structured to at least rotate, the plurality of diaphragm blades being capable of changing an area of an aperture, each of the diaphragm blades including portions on a part of an inner periphery, a radius of a shape of one portion being at the opposite side of a radius of a shape of the other portion, the inner periphery being a periphery forming an outer periphery of the aperture, wherein the one portion whose shape has the opposite radius has a form of an envelope, wherein the envelope is a tangent to each of a plurality of arcs, diameters of the plurality of arcs being the same as aperture-diameters between a full-aperture-diameter and a predetermined-small-aperture-diameter, inclusive;

an image pickup lens configured to guide object light to the aperture of the diaphragm unit; and an image pickup device configured to receive the object light entered through the aperture, and to obtain an imaging signal.

* * * * *